United States Patent
Shiba et al.

(10) Patent No.: US 12,102,905 B2
(45) Date of Patent: Oct. 1, 2024

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Takamasa Shiba, Tokyo (JP); Hiroshi Kobayashi, Tokyo (JP); Jun Waga, Tokyo (JP); Yutaka Yoshida, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 711 days.

(21) Appl. No.: 17/334,173

(22) Filed: May 28, 2021

(65) Prior Publication Data
US 2021/0370163 A1    Dec. 2, 2021

(30) Foreign Application Priority Data
May 29, 2020    (JP) .................................. 2020-094793

(51) Int. Cl.
| A63F 13/216 | (2014.01) |
| A63F 13/65 | (2014.01) |
| A63F 13/795 | (2014.01) |
| A63F 13/798 | (2014.01) |
| A63F 13/822 | (2014.01) |
| A63F 13/92 | (2014.01) |

(52) U.S. Cl.
CPC ............ *A63F 13/216* (2014.09); *A63F 13/65* (2014.09); *A63F 13/795* (2014.09); *A63F 13/798* (2014.09); *A63F 13/822* (2014.09); *A63F 13/92* (2014.09); *A63F 2300/205* (2013.01); *A63F 2300/638* (2013.01); *A63F 2300/8082* (2013.01)

(58) Field of Classification Search
None
See application file for complete search history.

(56) References Cited

FOREIGN PATENT DOCUMENTS

| JP | 2002159742 A | 6/2002 |
| JP | 2007135791 A | 6/2007 |

(Continued)

OTHER PUBLICATIONS

Tips to Get Started in Pokemon GO Trainer Battles, Jan. 13, 2019, Pokemon.com, https://web.archive.org/web/20190113222204/https://www.pokemon.com/us/strategy/tips-to-get-started-in-pokemon-go-trainer-battles/ (Year: 2019).*

(Continued)

*Primary Examiner* — Kevin Y Kim
(74) *Attorney, Agent, or Firm* — Dorsey & Whitney LLP

(57) ABSTRACT

A non-transitory computer-readable medium including a video game processing program for causing a server to perform functions to control progress of a video game using a virtual space corresponding to map information of a real space and positional information of a user terminal of a user is provided. The functions include: a registering function configured to register objects of a plurality of users; a generating function configured to generate a predetermined event on a basis of positional information of a user terminal of a first user; and a participating function configured to cause an object of a second user different from the first user, for whom the event is generated, among the objects registered by the registering function to participate in the event.

11 Claims, 15 Drawing Sheets

(56) References Cited

FOREIGN PATENT DOCUMENTS

| | | |
|---|---|---|
| JP | 2014079528 A | 5/2014 |
| JP | 2020074822 A | 5/2020 |

OTHER PUBLICATIONS

Get Started in the GO Battle League in Pokemon GO: Overview, Tips, and Rewards, Mar. 14, 2020, Pokemon.com, https://web.archive.org/web/20200314193258/https://www.pokemon.com/us/strategy/get-started-in-the-go-battle-league-in-pokemon-go-overview-tips-and-rewards/ (Year: 2020).*

Kevin Thielenhaus, Pokemon Masters: How To Grind Levels Easily | Auto-Battle Guide, Aug. 31, 2019, Gameranx, https://gameranx.com/features/id/179893/article/pokemon-masters-how-to-grind-levels-easily-auto-battle-guide/ (Year: 2019).*

[English Translation] Notice of Reasons for Refusal mailed July 13, 20201 for Japanese Application No. 2020-094793, pp. all.

"Kuchisaki-Bancho VS", Dengeki Bazooka!!, Japan, Kadokawa Corporation, vol. 2 No. 6,, Apr. 21, 2015, p. 143.

"Ninja Royale", Appli-Style, Japan, East Press Co., Ltd., vol. 6, Jan. 15, 2012, pp. 154-155.

* cited by examiner

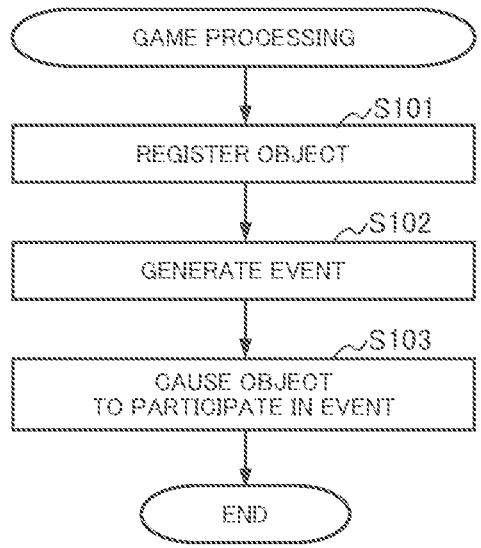
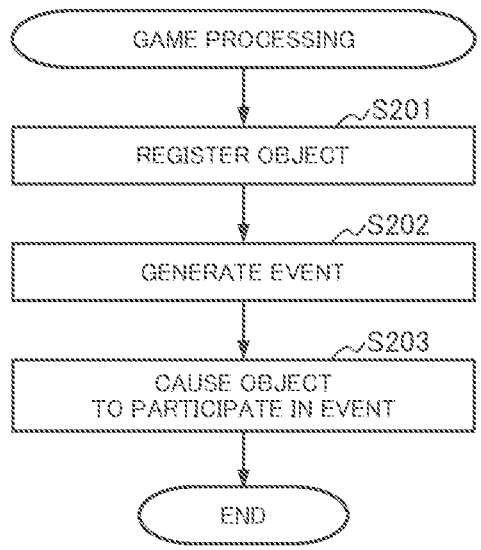

Fig. 17

| USER ID | REGISTERED OWN CHARACTER NAME | SELECTED OTHER CHARACTER NAME | CANDIDATE OTHER CHARACTER NAME |
|---|---|---|---|
| U01 | CHARACTER A | CHARACTER B | CHARACTER B |
| | | | CHARACTER D |
| | | | ⋮ |
| U02 | CHARACTER B | CHARACTER E | CHARACTER A |
| | | | CHARACTER C |
| | | | CHARACTER E |
| | | | ⋮ |
| ⋮ | ⋮ | ⋮ | ⋮ | ized in a case where the user terminal exists in a predetermined place in the real space.
NON-TRANSITORY COMPUTER-READABLE MEDIUM AND VIDEO GAME PROCESSING SYSTEM

CROSS-REFERENCE TO RELATED APPLICATION

The present application claims priority to and the benefit of Japanese Patent Application No. 2020-094793 filed on May 29, 2020, the disclosure of which is expressly incorporated herein by reference in its entirety for any purpose.

BACKGROUND

At least one of embodiments of the present disclosure relates to a non-transitory computer-readable medium including a video game processing program and a video game processing system for causing a server to perform functions to control progress of a video game using a virtual space corresponding to map information of a real space and positional information of a user terminal of a user.

In recent years, various systems each using positional information of a user terminal have been proposed in a field of video games.

In such a system, there is one in which a user terminal is caused to display map information of a real space containing positional information of the user terminal, and a predetermined game event is generated in a case where the user terminal exists in a predetermined place in the real space. Examples of such system may be found in Japanese Patent Application Publication No. 2002-159742.

SUMMARY

Now, in systems using positional information of a user terminal, there is one in which objects are arranged in a virtual space corresponding to map information of a real space, and an event corresponding to the object is generated in accordance with a relationship between a position of the object and a position in the virtual space corresponding to positional information of a user terminal. Here, in a case where there is no interaction among a plurality of users in progress of a video game, the sense of unity among the users that the video game is progressing in the same virtual space is weakened. As a result, there has been possibility that interest of the user in the video game is diminished.

It is an object of at least one of embodiments of the present disclosure to solve the problem described above, and to maintain interest of a user in a video game.

According to one non-limiting aspect of the present disclosure, there is provided a non-transitory computer-readable medium including a video game processing program for causing a server to perform functions to control progress of a video game using a virtual space corresponding to map information of a real space and positional information of a user terminal of a user.

The functions include a registering function configured to register objects of a plurality of users.

The functions also include a generating function configured to generate a predetermined event on a basis of positional information of a user terminal of a first user.

The functions also include a participating function configured to cause an object of a second user different from the first user, for whom the event is generated, among the objects registered by the registering function to participate in the event.

According to another non-limiting aspect of the present disclosure, there is provided a video game processing system for controlling progress of a video game using a virtual space corresponding to map information of a real space and positional information of a user terminal of a user. The video game processing system includes a communication network, a server, and the user terminal.

The video game processing system includes a registerer configured to register objects of a plurality of users.

The video game processing system also includes a generator configured to generate a predetermined event on a basis of positional information of a user terminal of a first user.

The video game processing system also includes a participator configured to cause an object of a second user different from the first user, for whom the event is generated, among the objects registered by the registerer to participate in the event.

According to still another non-limiting aspect of the present disclosure, there is provided a non-transitory computer-readable medium including a video game processing program for causing a user terminal to perform functions to control progress of a video game using a virtual space corresponding to map information of a real space and positional information of the user terminal of a user.

The functions include a registering function configured to register objects of a plurality of users.

The functions also include a generating function configured to generate a predetermined event on a basis of positional information of a user terminal of a first user.

The functions also include a participating function configured to cause an object of a second user different from the first user, for whom the event is generated, among the objects registered by the registering function to participate in the event.

According to each of the embodiments of the present application, one or two or more shortages are solved.

BRIEF DESCRIPTION OF DRAWINGS

The foregoing and other objects, features and advantages of the present disclosure will become more readily apparent from the following detailed description of preferred embodiments of the present disclosure that proceeds with reference to the appending drawings:

FIG. 4 is a flowchart illustrating an example of an operation of a server in the game processing corresponding to at least one of the embodiments of the present disclosure;

FIG. 5 is a flowchart illustrating an example of an operation of a terminal in the game processing corresponding to at least one of the embodiments of the present disclosure;

FIG. 17 is an explanatory drawing for explaining an example of a storage state of information corresponding to at least one of the embodiments of the present disclosure;

DETAILED DESCRIPTION

Hereinafter, examples of embodiments according to the present disclosure will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
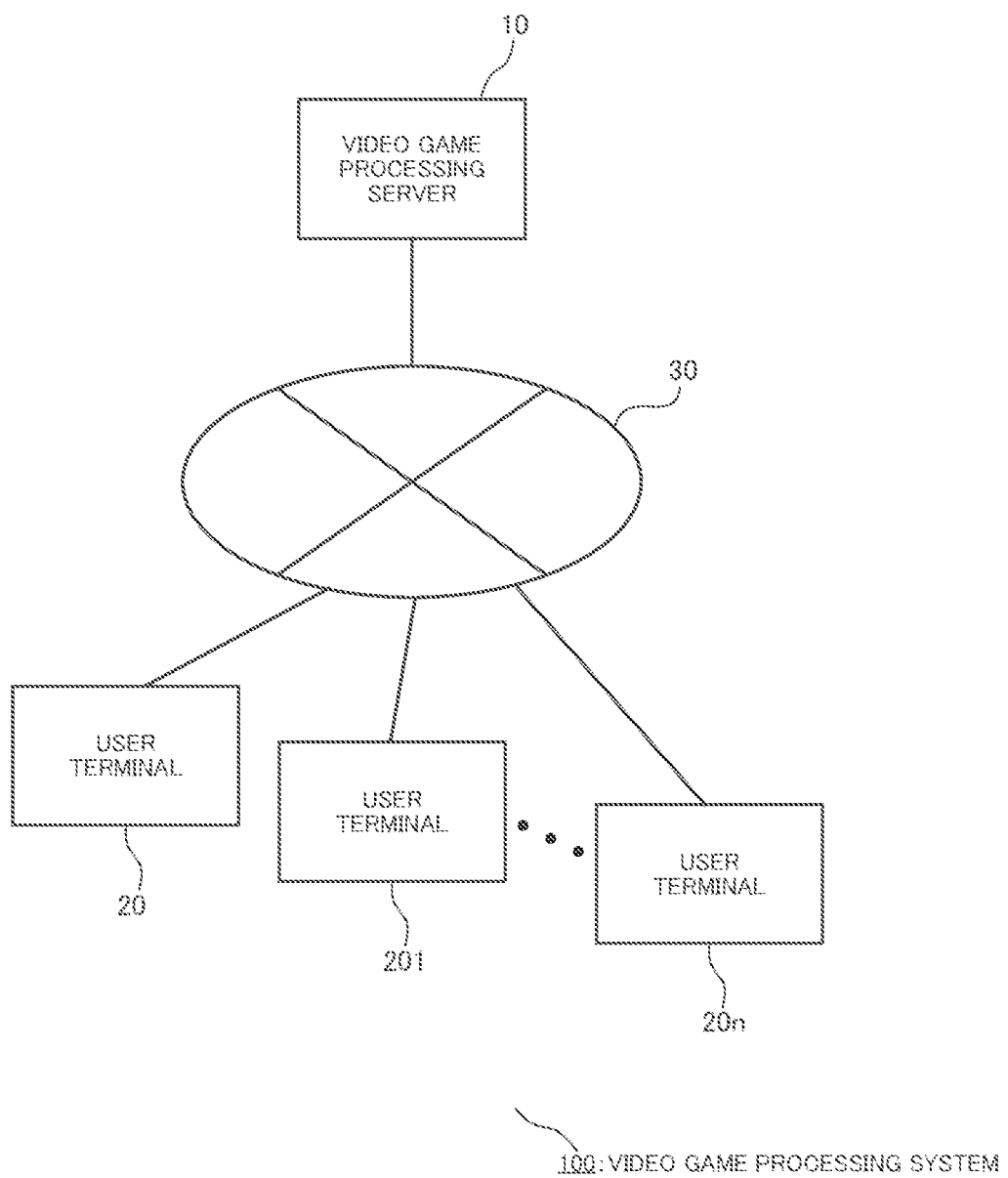
FIG. 1 is a block diagram illustrating an example of a configuration of a video game processing system corresponding to at least one of the embodiments of the present disclosure.

FIG. 1 is a block diagram illustrating an example of a configuration of a video game processing system 100 according to one embodiment of the present disclosure. As illustrated in FIG. 1, the video game processing system 100 includes a video game processing server 10 (hereinafter, referred to as a "server 10") and user terminals 20, and 201 to 20n ("n" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20n is connected to a communication network 30 such as the Internet. In this regard, although it is not illustrated in the drawings, the plurality of user terminals 20 and 201 to 20n is connected to the communication network 30 by executing data communication with base stations managed by a telecommunication carrier by means of a radio communication line.

The video game processing system 100 includes the server 10 and the plurality of user terminals 20 and 201 to 20n, whereby various kinds of functions for executing various kinds of processing in response to an operation of the user are performed.

The server 10 is managed by an administrator of the video game processing system 100, and has various kinds of functions to provide information regarding various kinds of processing to the plurality of user terminals 20 and 201 to 20n. In the present embodiment, the server 10 is constructed by an information processing apparatus, such as a WWW server, and includes a storage medium for storing various kinds of information. In this regard, the server 10 is provided with a general configuration for executing the various kinds of processing as a computer, such as a control section and a communicating section. However, its explanation herein is omitted. Further, in the video game processing system 100, it is preferable that the server 10 manages various kinds of information from a point of view to reduce a processing load on each of the plurality of user terminals 20 and 201 to 20n. However, a storing section for storing various kinds of information may include a storage region in a state that the server 10C an access the storage region. For example, the server 10 may be configured so as to be provided with a dedicated storage region outside the server 10.

Figure 2:
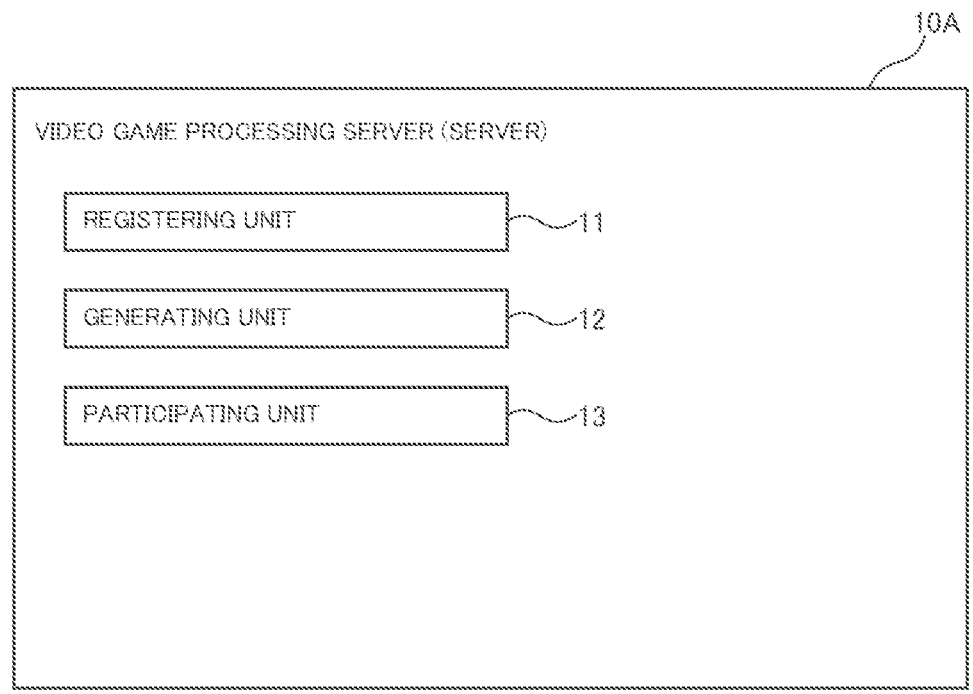
FIG. 2 is a block diagram illustrating a configuration of a server corresponding to at least one of the embodiments of the present disclosure.

FIG. 2 is a block diagram illustrating a configuration of a video game processing server 10A (hereinafter, referred to as a "server 10A"), which is an example of the server 10. As illustrated in FIG. 2, the server 10A at least includes a registering unit 11, a generating unit 12, and a participating unit 13.

The registering unit 11 has a function to register objects of the plurality of users corresponding to the plurality of user terminals 20, and 201 to 20n.

Here, each of the objects of the plurality of users means an object corresponding to the user. Further, the object means a virtual object that appears in a video game. A configuration of each of the objects of the plurality of users is not limited particularly. However, it is preferable that the object may be used for progress of the video game by the user. As an example of the objects of the plurality of users, there is a character of the corresponding user.

Further, the phase "register objects" means that information regarding the objects is stored in a predetermined storage unit. A configuration to register objects is not limited particularly. However, it is preferable that the registering unit 11 is configured so that information for causing the object to appear in the video game is stored in the predetermined storage unit. As an example of the configuration to register objects, there is a configuration in which identification information and parameters of the object are stored in the predetermined storage unit The generating unit 12 has a function to generate a predetermined event on the basis of positional information of the user terminal 20 of the user (that is, a first user).

Here, the positional information of the user terminal 20 means information indicating a position of the user terminal 20 in the real space. A configuration of the positional information is not limited particularly. However, it is preferable that the positional information is configured so as to contain coordinates that can specify the position of the user terminal 20 in the real space. As examples of the configuration to obtain the positional information of the user terminal 20, there are a configuration to obtain the positional information by using a GPS signal, and a configuration to obtain the positional information on the basis of reception intensity information of wireless signals from a plurality of beacon transmitters.

Further, the phrase "on the basis of positional information of the user terminal 20" means that the positional information of the user terminal 20 is used. As examples to a configuration to generate the predetermined event using the positional information of the user terminal 20, there are a configuration in which satisfaction of a predetermined condition regarding the positional information of the user terminal 20 is included in a generation condition of the event, and a configuration in which the content of the event is defined by using the positional information of the user terminal 20.

Further, the event means any of various kinds of occurrences that can be generated in the video game. A configuration of the event is not limited particularly. However, it is preferable that the event is configured so that the event is generated in a case where a generation condition is satisfied in a virtual space corresponding to map information of the real space in accordance with progress of the video game. As an example of the predetermined event, there is an event that is associated with an object arranged in the virtual space corresponding to the map information of the real space. In this regard, as an example of the event associated with the object, there are various kinds of events each of which is associated with a type of the object.

Here, the virtual space corresponding to the map information of the real space means a virtual space that is generated by using the map information of the real space. A configuration to generate the virtual space is not limited particularly. However, it is preferable that the generating unit 12 is configured so that the user can recognize that the virtual space is generated on the basis of the map information of the real space. As an example of such a configuration, there is a configuration in which the virtual space is generated by respectively arranging objects corresponding to roads and buildings in the real space at positions corresponding to roads and buildings in the real space. In this regard, a configuration of the object corresponding to each of the roads and the buildings in the real space is not limited particularly. However, it is preferable that the object is configured so that the user can recognize that it has a correspondence relationship with a road, a building, or the like. As examples of such a configuration, there are an object created to resemble the appearance of a road and an object (for example, an enemy character) different from objects that constitute the virtual space (for example, the ground). Further, a configuration to associate the position in the real space with the position in the virtual space is not limited particularly. However, the generating unit 12 may be configured so that a coordinate in the real space and a coordinate in the virtual space are defined in a one-to-one relationship, or may be configured so that the coordinates are defined in a plural-to-one relationship or a one-to-plural relationship.

The participating unit 13 has a function to cause an object of another user different from the user (that is, a second user), for whom the event is generated, among the objects registered by the registering unit 11 to participate in the event.

Here, a configuration to specify the object of the other user different from the user for whom the event is generated is not limited particularly. The participating unit 13 may be configured so as to specify a predetermined number of objects in accordance with a predetermined rule from the registered objects, or may be configured so as to cause the user to select an object. In this regard, it is preferable that the other user different from the user for whom the event is generated uses another user terminal 20 different from the user terminal 20 of the user (for example, the user terminal 201).

Further, a configuration to cause the object to participate in the event is not limited particularly. However, it is preferable that the object is caused to contribute progress of the event. As an example of such a configuration, there is a configuration in which a character is caused to fight with an enemy character in a battle event with the enemy character.

Each of the plurality of user terminals 20, and 201 to 20n is managed by the user, and is configured by a communication terminal capable of playing a network delivery type game, such as a cellular telephone terminal, a PDA (Personal Digital Assistants), a portable game apparatus, or a so-called wearable device, for example. In this regard, the configuration of the user terminal that the video game processing system 100 can include is not limited to the example described above. Each of the user terminals 20, and 201 to 20n may be configured so that the user can recognize the video game. As the other examples of the user terminal, there are one obtained by combining various kinds of communication terminals, a personal computer, and a stationary game apparatus.

Further, each of the plurality of user terminals 20, and 201 to 20n is connected to the communication network 30, and includes hardware (for example, a display device for displaying a browser screen or a game screen based on a coordinate and the like) and software for executing various kinds of processes by communicating with the server 10A. In this regard, each of the plurality of user terminals 20, and 201 to 20n may be configured so as to be able to directly communicate with each other without the server 10A.

Next, an operation of the video game processing system 100 (hereinafter, referred to as the "system 100") according to the present embodiment will be described.

Figure 3:
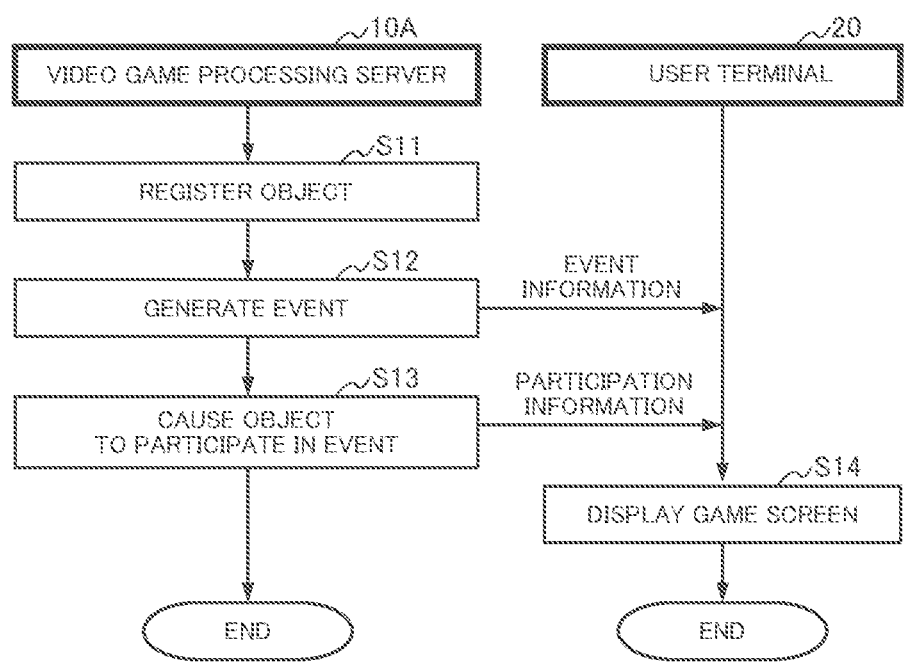
FIG. 3 is a flowchart illustrating an example of game processing corresponding to at least one of the embodiments of the present disclosure.

FIG. 3 is a flowchart illustrating an example of game processing executed by the system 100. In the game processing according to the present embodiment, processes related to a control of progress of the video game using the positional information of the user terminal 20 are executed. Hereinafter, a case where the server 10A and the user terminal 20 (hereinafter, referred to as the "terminal 20") execute the game processing will be described as an example.

The game processing is started as an opportunity that the terminal 20 accessing the server 10A requests display of the virtual space, for example.

In the game processing, the server 10A first registers objects of the users (Step S11). In the present embodiment, the server 10A stores information regarding the objects of the users in a predetermined storage region.

When the objects of the users are registered, the server 10A generates a predetermined event on the basis of positional information of the terminal 20 of the user (Step S12). In the present embodiment, the server 10A transmits event information for causing the terminal 20 to generate the predetermined event to the terminal 20.

When the predetermined event is generated, the server 10A cause an object of another user different from the user for whom the event is generated among the registered objects to participate in the predetermined event (Step S13). In the present embodiment, the server 10A transmits, to the terminal 20, participation information for causing an object different from that of the user for whom the event is generated to participate in the event.

When the participation information is received from the server 10A, the terminal 20 outputs a game screen to a display screen of a predetermined display device (Step S14). In the present embodiment, when the terminal 20 outputs the game screen, the terminal 20 and the server 10A terminate the processes herein.

FIG. 4 is a flowchart illustrating an example of an operation of the server 10A in the game processing. Here, an operation of the server 10A in the system 100 will be described again.

In the game processing, the server 10A first registers objects of the plurality of users (Step S101); generates a predetermined event on the basis of positional information of the terminal 20 of the user (Step S102); and causes an object of a user different from the user, for whom the event is generated, among the registered objects to participate in the predetermined event (Step S103). When the object is caused to participate in the event, the server 10A terminates the processes herein.

FIG. 5 is a flowchart illustrating an example of an operation of the terminal 20 in a case where the terminal 20 executes the game processing. Hereinafter, a case where the terminal 20 executes the game processing by a single body will be described as an example. In this regard, the configuration of the terminal 20 includes the similar functions to those of the server 10A except that the terminal 20 receives various kinds of information from the server 10A. For this reason, its explanation is omitted from a point of view to avoid repeated explanation.

In the game processing, the terminal 20 first registers objects of the users (Step S201); generates a predetermined event on the basis of positional information of the terminal 20 of the user (Step S202); and causes an object of a user different from the user, for whom the event is generated, among the registered objects to participate in the predetermined event (Step S203). When the object is caused to participate in the event, the terminal 20 terminates the processes herein.

As explained above, as one aspect of the first embodiment, the server 10A that controls progress of the video game using the virtual space corresponding to the map information of the real space and the positional information of the user terminal 20 is configured so as to include the registering unit 11, the generating unit 12, and the participating unit 13. Thus, the registering unit 11 registers the objects of the users; the generating unit 12 generates the predetermined event on the basis of the positional information of the terminal 20 of the user; and the participating unit 13 causes the object of the other user different from the user, for whom the event is generated, among the registered objects to participate in the event. Therefore, it becomes possible to maintain interest of the user in the video game.

Namely, by causing the users to interact with each other through the object in the video game using the virtual space corresponding to the map information of the real space and the positional information of the user terminal, it becomes possible to enhance the sense of unity among the users that the video game is progressing in the same virtual space. As a result, it becomes possible to maintain interest of the user in the video game. In other words, by causing the object of the other user to participate in the generated event in the video game using the virtual space corresponding to the map information of the real space and the positional information of the user terminal, it is possible to give the user a feeling of causing the video game to proceed with the other user through the object in the virtual space, and this makes it possible for the user to further have interest in progress of the video game. Moreover, by causing the object of the other user to participate in the event generated on the basis of the positional information, it is possible to give the user the feeling of causing the video game to proceed with the other user even in the real space, and this makes it possible for the user to further have interest in progress of the video game.

Second Embodiment

Figure 6:
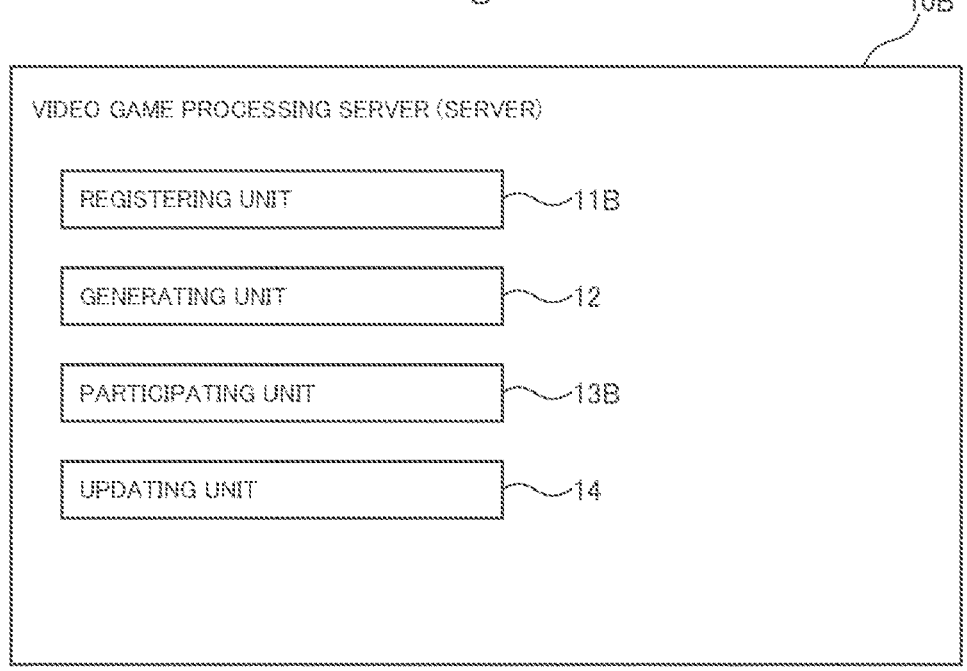
FIG. 6 is a block diagram illustrating a configuration of a server corresponding to at least one of the embodiments of the present disclosure.

FIG. 6 is a block diagram illustrating a configuration of a video game processing server 10B (hereinafter, referred to as a "server 10B"), which is an example of the video game processing server 10. In the present embodiment, the server 10B at least includes a registering unit 11B, a generating unit 12, a participating unit 13B, and an updating unit 14.

The registering unit 11B has a function to register registration related information, in which a user is associated with objects of the other users different from the user, in a predetermined storage region.

Here, the registration related information means a combination of information in which identification information of the user is at least associated with information regarding the objects of the other users different from the user. The registration related information is not limited particularly. However, it is preferable that the registration related information contains information indicating whether the user can participate in an event or not.

The participating unit 13B has a function to cause at least a part of the objects associated with the user for whom the event is generated to participate in the event.

Here, at least the part of the objects means an object or objects defined in accordance with a predetermined rule among the objects registered by the registering unit 11B. A configuration to specify at least the part of the objects is not limited particularly. However, it is preferable that the participating unit 13B is configured so as to specify the object in accordance with a predetermined rule that the user can recognize. As an example of such a configuration, there is a configuration in which an object is specified on the basis of information regarding the user.

The updating unit 14 has a function to update the registration related information so that participation of each of the objects, which have already participated in the event by the participating unit 13B, in a new event generated after the event is restricted.

Here, the phrase "after the event" means after a time when the event is generated. A definition of "after the event is generated" is not limited particularly. However, it is preferable to be after a time when the user can recognize that restriction of generation of an event is started. As examples of the definition of "after the event is generated", there are after a time when the event is started, after a time when the event is terminated, and after a predetermined time in the started event.

Further, the phrase "participation of the object in the event is restrict" means that a permissible range where the object is caused to participate in the event is defined. A configuration to restrict participation of the object in the event is not limited particularly. However, it is preferable that participation in the event is disabled in a case where the permissible range is exceeded for the object. As an example of such a configuration, there is a configuration in which a period of time during which a character cannot participate in a battle event with an enemy character is defined. In this regard, as examples of the permissible range, there are a predetermined period of time from a predetermined time and a predetermined upper limit of the number of times of participation in an event.

Further, the phrase "update the registration related information" means that at least part of the registration related information is changed. A configuration to update the registration related information is not limited particularly. However, it is preferable that information is updated so that an object caused to participate in an event by the participating unit 13B is specified. As examples of the configuration to update the registration related information, there are a configuration in which information indicating an object caused to participate in an event by the participating unit 13B is changed, and a configuration in which flag information corresponding to each object is changed.

Figure 7:
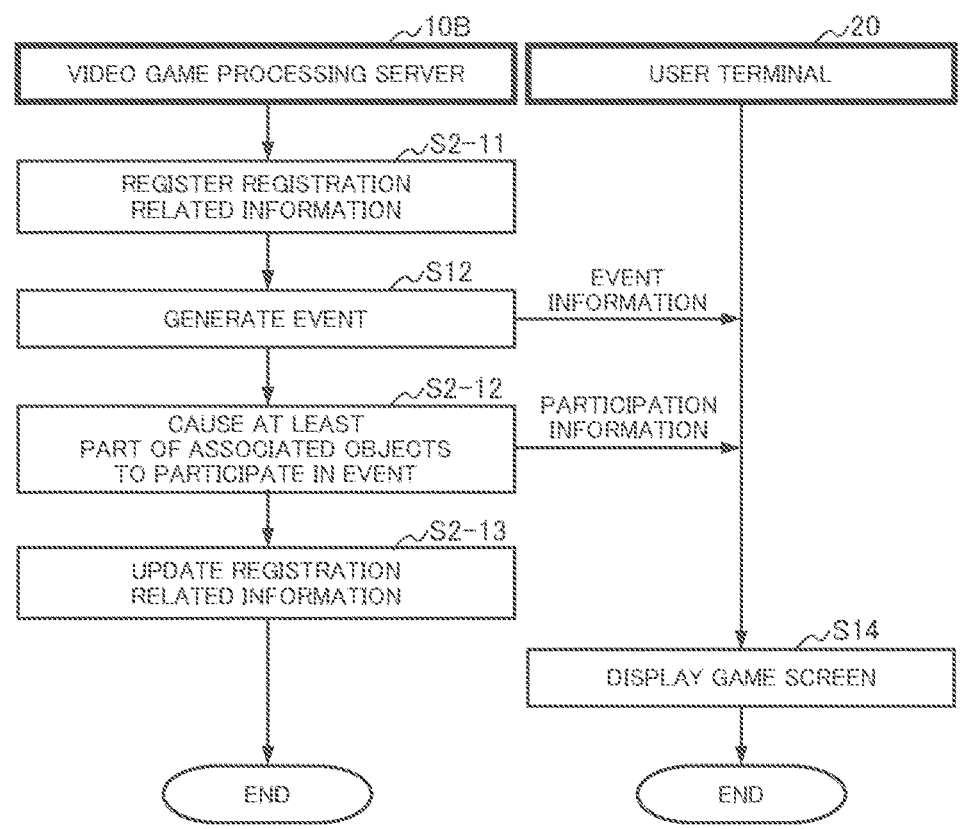
FIG. 7 is a flowchart illustrating an example of game processing corresponding to at least one of the embodiments of the present disclosure.

FIG. 7 is a flowchart illustrating an example of game processing executed by the video game processing system 100 (see FIG. 1). Hereinafter, operations of the server 10B and a user terminal 20 (hereinafter, referred to as a "terminal 20") will be described as an example. In this regard, a flowchart illustrating an operation of each of the server 10B and the terminal 20 is omitted from a point of view to avoid repeated explanation.

The server 10B registers registration related information, in which a user is associated with an object of another user different from the user, in a predetermined storage region (Step S2-11). In the present embodiment, the server 10B respectively registers registration related information, in which each user is associated with objects of users different from the corresponding user, in predetermined storage regions.

When the registration related information is registered, the server 10B causes at least a part of the objects corresponding to the user for whom an event is generated to participate in the event (Step S2-12). In the present embodiment, the server 10B transmits, to the terminal 20, participation information for causing at least a part of the objects to participate in the event.

When the object is caused to participate in the event, the server 10B updates the registration related information so that participation of each of the objects, which have already participated in the event, in a new event generated after the event is restricted (Step S2-13). In the present embodiment, the server 10B changes information indicating the object that participate in the event, which is part of the registration related information, so as to designate another object associated with the user.

As explained above, as one aspect of the second embodiment, the server 10B that controls progress of the video game using the virtual space corresponding to the map information of the real space and the positional information of the user terminal 20 is configured so as to include the registering unit 11B, the generating unit 12, the participating unit 13B, and the updating unit 14. Thus, the registering unit 11B registers the registration related information, in which the user is associated with the objects of the other users different from the user, in the predetermined storage region; the participating unit 13B causes at least the part of the objects associated with the user for whom the event is generated to participate in the event; and the updating unit 14 updates the registration related information so that the participation of the object caused to participate in the event in another event that is generated after the event is restricted. Therefore, it becomes possible to interact with more users through the object compared with a case where participation of the object in another event is not restricted, and this makes it possible to further maintain interest of the user in the video game.

Third Embodiment

Figure 8:
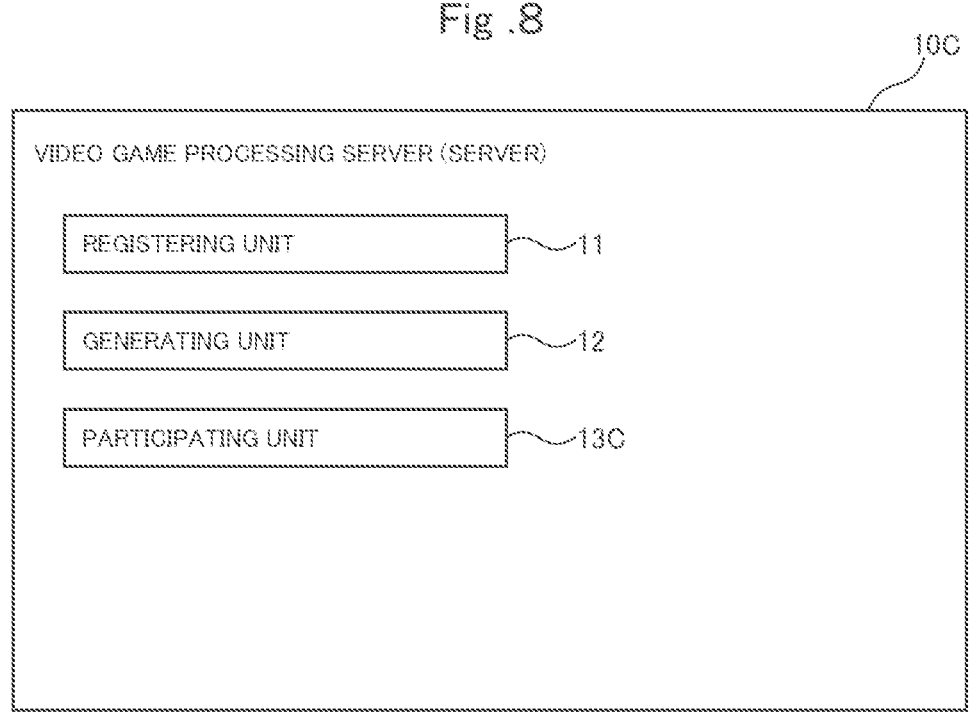
FIG. 8 is a block diagram illustrating a configuration of a server corresponding to at least one of the embodiments of the present disclosure.

FIG. 8 is a block diagram illustrating a configuration of a video game processing server 10C (hereinafter, referred to as a "server 10C"), which is an example of the video game processing server 10. In the present embodiment, the server 10C at least includes a registering unit 11, a generating unit 12, and a participating unit 13C.

The participating unit 13C has a function to cause an object, which is registered by the registering unit 11 and satisfies a predetermined condition in accordance with progress of a video game by a user, to participate in an event generated by the user.

Here, the phrase "in accordance with progress of a video game" means that occurrence of various kinds of progress or changes and the like that can be generated in the video game becomes timing or a standard of a specific process. As examples of the specific process, there are a determining process, an information updating process, and the like. Further, as examples of the various kinds of progress or changes that can be generated in the video game, there are progress of time, a change in a game element value, a specific status or update of a flag, an operation input by the user, and the like.

Further, the content of the predetermined condition is not limited particularly. However, it is preferable that the user can recognize the content of the predetermined condition. As examples of the predetermined condition, there are a condition that the object is associated with a user who has a predetermined relationship with the user for whom the event is generated, and a condition that the object has a common point to the object of the user for whom the event is generated.

Figure 9:
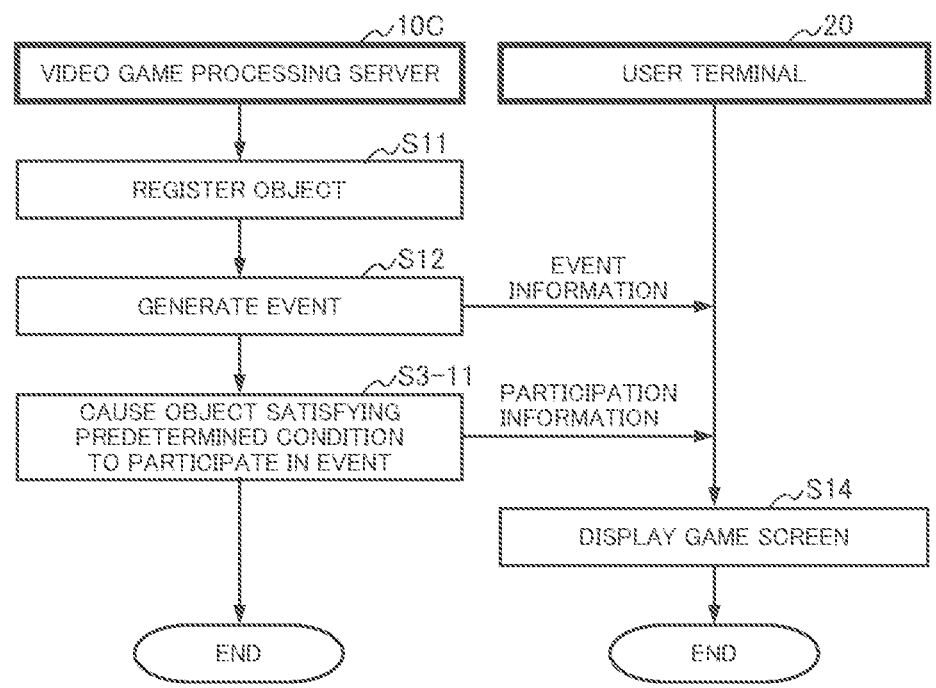
FIG. 9 is a flowchart illustrating an example of game processing corresponding to at least one of the embodiments of the present disclosure.

FIG. 9 is a flowchart illustrating an example of game processing executed by the video game processing system 100 (see FIG. 1). Hereinafter, operations of the server 10C and a user terminal 20 (hereinafter, referred to as a "terminal 20") will be described as an example. In this regard, a flowchart illustrating an operation of each of the server 10C and the terminal 20 is omitted from a point of view to avoid repeated explanation.

When a predetermined event is generated, the server 10C causes an object, which is registered by the registering unit 11 and satisfies a predetermined condition in accordance with progress of the video game by the user, to participate in an event generated by the user (Step S3-11). In the present embodiment, the server 10C transmits, to the terminal 20, participation information for causing the object to participate in the event.

As explained above, as one aspect of the third embodiment, the server 10C that controls progress of the video game using the virtual space corresponding to the map information of the real space and the positional information of the user terminal 20 is configured so as to include the registering unit 11, the generating unit 12, and the participating unit 13C. Thus, the participating unit 13C cause the registered object, which satisfies the predetermined condition in accordance with progress of the video game by the user, to participate in the event generated by the user. Therefore, it becomes possible to cause an object, which can contribute to maintenance of interest of the user in the video game relatively significantly, to participate in the event, and it becomes possible to cause the object to participate in the event while maintaining an appropriate game balance.

Fourth Embodiment

Figure 10:
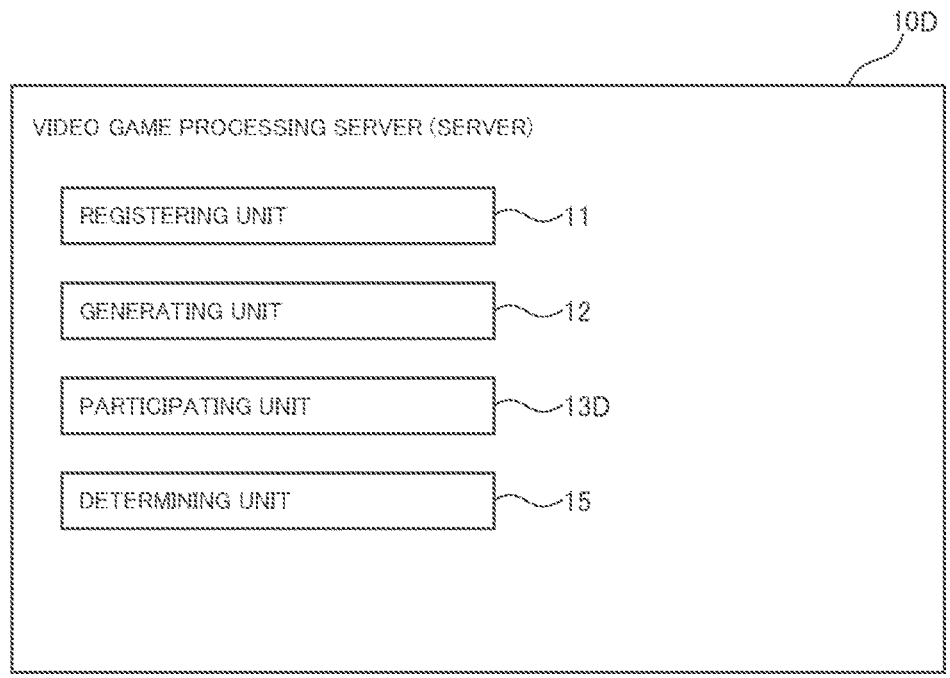
FIG. 10 is a block diagram illustrating a configuration of a server corresponding to at least one of the embodiments of the present disclosure.

FIG. 10 is a block diagram illustrating a configuration of a video game processing server 10D (hereinafter, referred to as a "server 10D"), which is an example of the video game processing server 10. In the present embodiment, the server 10D at least includes a registering unit 11, a generating unit 12, a participating unit 13D, and a determining unit 15.

The determining unit 15 has a function to determine whether an object of another user (the other user) different from a user for whom an event is generated is caused to participate in the event or not on the basis of information regarding a generated event.

Here, the information regarding the event is not limited particularly. However, it is preferable that the information regarding the event is information regarding a type of an event. As an example of the information regarding the event, there is information in which a type of an event is associated with a probability to cause an object of the other user to participate in an event.

Further, a configuration to determine whether the object is caused to participate in the event or not is not limited particularly. However, it is preferable that the configuration is a configuration in which a probability corresponding to a type of an event is used. As an example of such a configuration, there is a configuration in which plural types of events each of which has a different probability to cause an object of the other user to participate in an event are provided.

The participating unit 13D has a function to cause the object to participate in the event in a case where the determining unit 15 determines that the object is caused to participate in the event.

Here, a configuration to cause the object, for which it is determined to be caused to participate in the event, (a participation object) to participate in the event is not limited particularly. However, it is preferable that the participating unit 13D is configured so that the object can participate in the event as the same time as the start of the event. As an example of such a configuration, there is a configuration in which a user for whom an event is generated is notified of a participation object as the same time as the start of the event.

Figure 11:
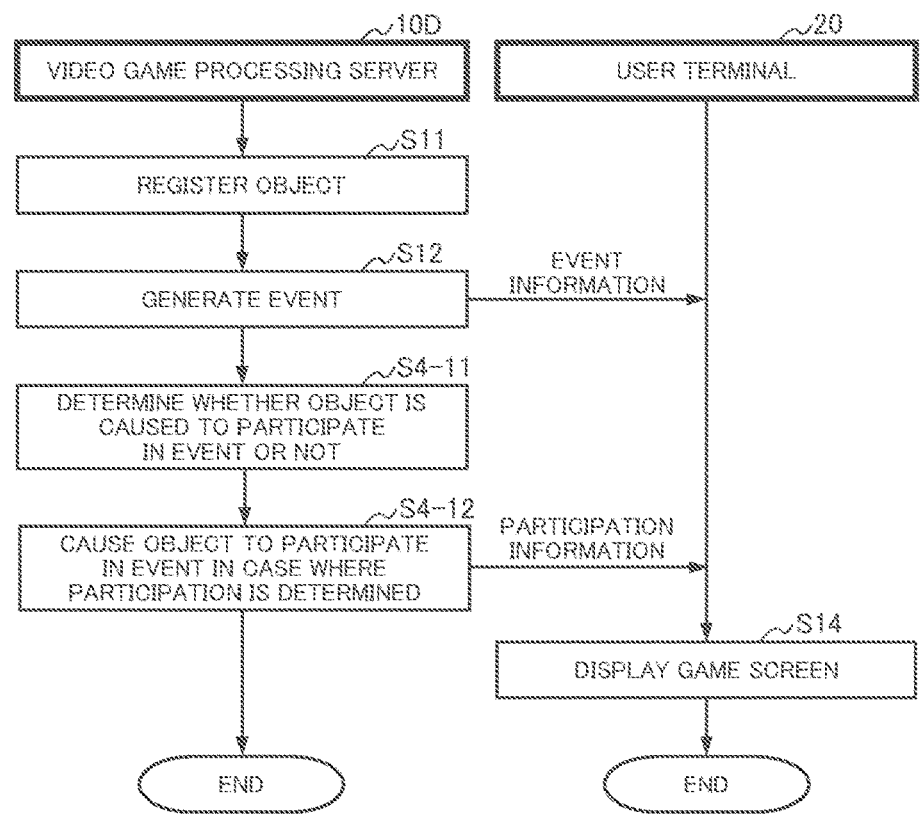
FIG. 11 is a flowchart illustrating an example of game processing corresponding to at least one of the embodiments of the present disclosure.

FIG. 11 is a flowchart illustrating an example of game processing executed by the video game processing system 100. Hereinafter, operations of the server 10D and the user terminal 20 (hereinafter, referred to as the "terminal 20") will be described as an example. In this regard, a flowchart illustrating an operation of each of the server 10D and the terminal 20 is omitted from a point of view to avoid repeated explanation.

When a predetermined event is generated, the server 10D determines whether an object of another user different from a user for whom the predetermined event is generated is caused to participate in the predetermined event or not on the basis of information regarding the generated event (Step S4-11). In the present embodiment, the server 10D determines whether the object of the other user different from the user for whom the event is generated is caused to participate in the event or not on the basis of a probability corresponding to a type of the event.

When it is determined whether the object is caused to participate in the event or not, the server 10D causes the object to participate in the event in a case where it is determined that the object is caused to participate in the event (Step S4-12). In the present embodiment, the server 10D transmits, to the terminal 20, participation information for causing the object to participate in the event.

As explained above, as one aspect of the fourth embodiment, the server 10D that controls progress of the video game using the virtual space corresponding to the map information of the real space and the positional information of the user terminal 20 is configured so as to include the registering unit 11, the generating unit 12, the participating unit 13D, and the determining unit 15. Thus, the determining unit 15 determines whether the object of the other user different from the user for whom the event is generated is caused to participate in the event or not on the basis of the information regarding the generated event; and the participating unit 13D causes the object to participate in the event in a case where it is determined that the object is caused to participate in the event. Therefore, it becomes possible to provide an opportunity for interaction among users through an object, and to set an appropriate game balance at the same time.

Fifth Embodiment

Figure 12:
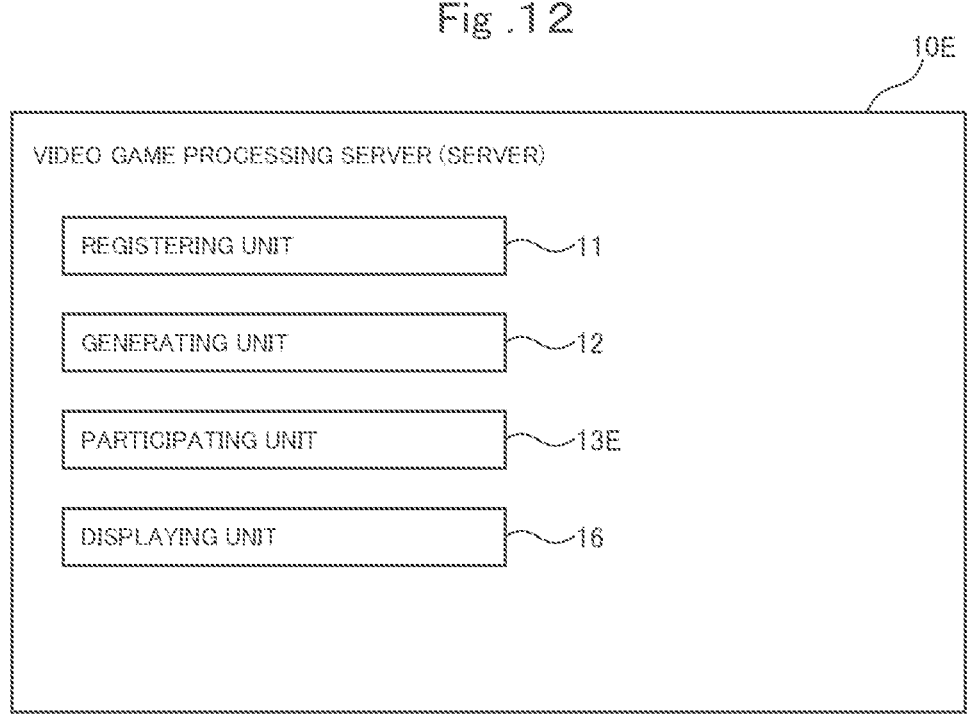
FIG. 12 is a block diagram illustrating a configuration of a server corresponding to at least one of the embodiments of the present disclosure.

FIG. 12 is a block diagram illustrating a configuration of a video game processing server 10E (hereinafter, referred to as a "server 10E"), which is an example of the video game processing server 10. In the present embodiment, the server 10E at least includes a registering unit 11, a generating unit 12, a participating unit 13E, and a displaying unit 16.

The displaying unit 16 has a function to selectably display, for a user, an object of another user different from the user.

Here, the phrase "selectably display an object for a user" means that information regarding the object is displayed so that a selection operation for the object can be received from the user. A configuration to selectably display the object for the user is not limited particularly. However, it is preferable that the displaying unit 16 is configured so as to display information for comparing the object with another object on a user terminal 20 of the user in a state where the selection operation can be received from the user. As an example of such a configuration, there is a configuration in which an image and a name of an object, and a numerical value corresponding to the object are displayed on the user terminal 20 of the user in a state where the selection operation can be received from the user.

The participating unit 13E has a function to cause an object selected by the user to participate in a generated event.

Here, the object selected by the user means an object that is selectably displayed by the displaying unit 16 and for which a selection operation is received from the user.

Figure 13:
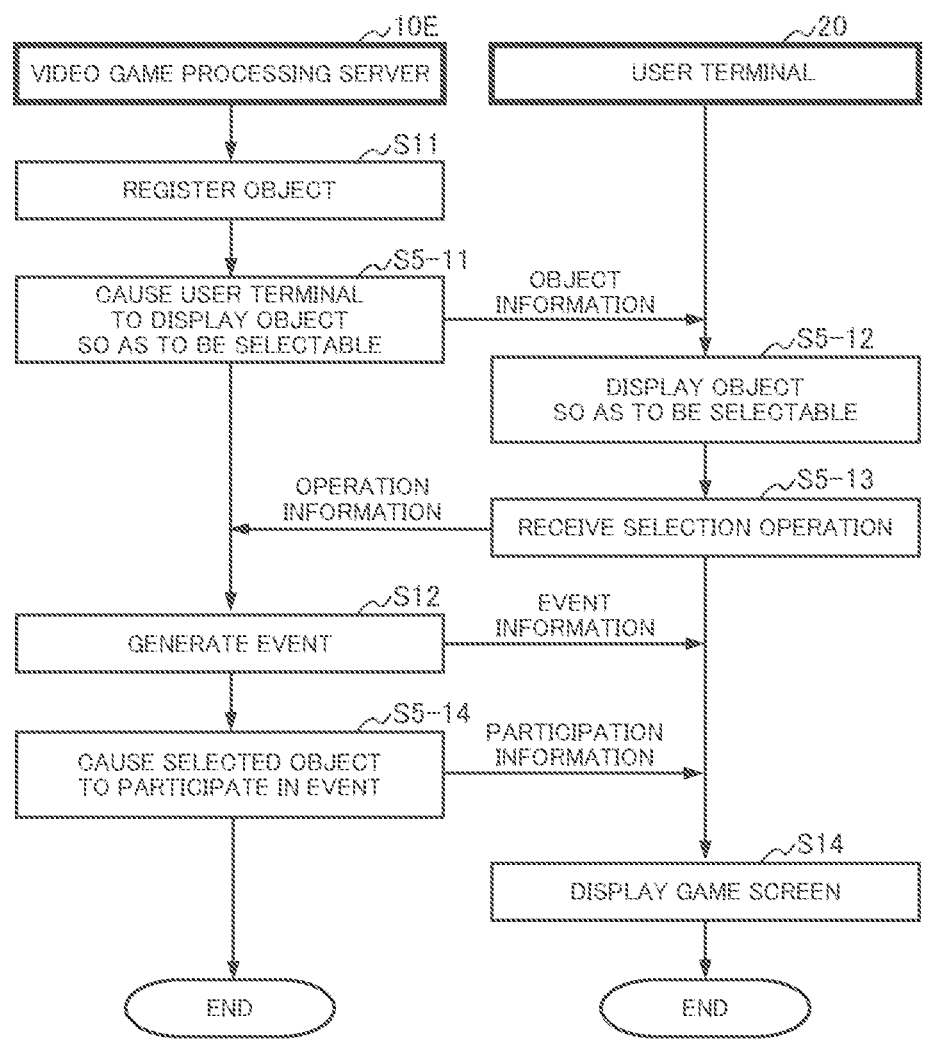
FIG. 13 is a flowchart illustrating an example of game processing corresponding to at least one of the embodiments of the present disclosure.

FIG. 13 is a flowchart illustrating an example of game processing executed by the video game processing system 100. Hereinafter, operations of the server 10E and he user terminal 20 (hereinafter, referred to as the "terminal 20") will be described as an example. In this regard, a flowchart illustrating an operation of each of the server 10E and the terminal 20 is omitted from a point of view to avoid repeated explanation.

When an object is registered, the server 10E selectably displays, for the user, an object of a user different from the user (Step S5-11). In the present embodiment, the server 10E transmits, to the terminal 20, object information for selectably displaying the object.

When the object information is received from the server 10E, the terminal 20 selectably displays, for the user, the object on the basis of the object information (Step S5-12). In the present embodiment, the terminal 20 outputs a game screen, which includes an image by which the object can be selected, to a display screen of a predetermined display device.

When the object is selectably displayed for the user, the terminal 20 receives a selection operation against the object from the user (Step S5-13). In the present embodiment, the terminal 20 transmits, to the server 10E, selection information regarding selection of the object.

When an event is generated, the server 10E causes the object selected by the user to participate in the generated event (Step S5-14). In the present embodiment, the server 10E transmits, to the terminal 20, participation information for causing the object to participate in the event.

As explained above, as one aspect of the fifth embodiment, the server 10E that controls progress of the video game using the virtual space corresponding to the map information of the real space and the positional information of the user terminal 20 is configured so as to include the registering unit 11, the generating unit 12, the participating unit 13E, and the displaying unit 16. Thus, the displaying unit 16 selectably displays, for the user, the object of another user different from the user; and the participating unit 13E causes the object selected by the user to participate in the generated event. Therefore, it becomes possible to interact with more other users desired by the user through the object, and this makes it possible to further maintain interest of the user in the video game.

Sixth Embodiment

Figure 14:
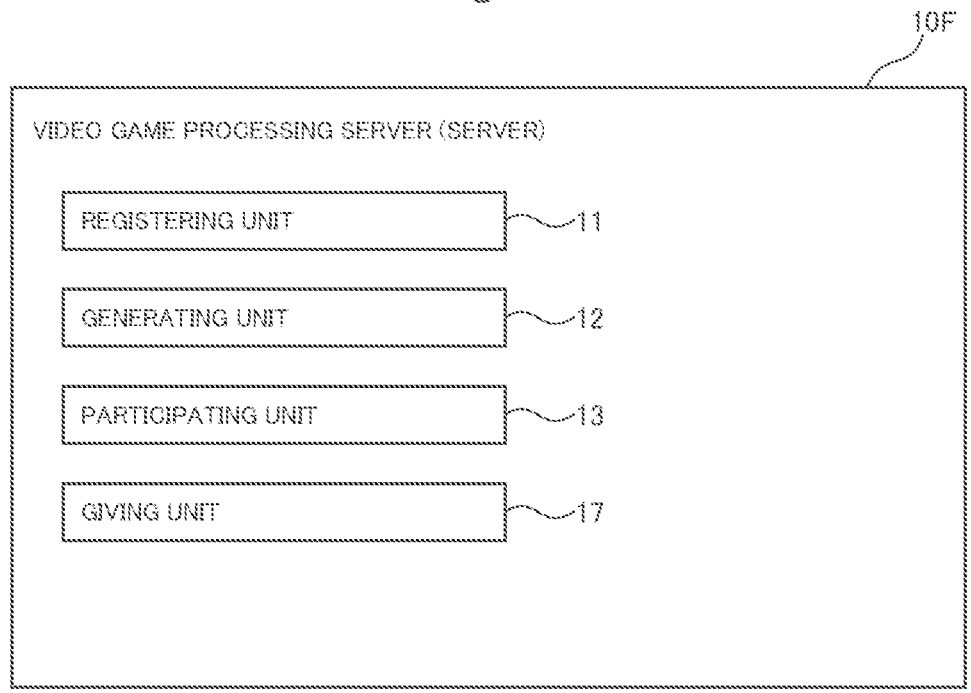
FIG. 14 is a block diagram illustrating a configuration of a server corresponding to at least one of the embodiments of the present disclosure.

FIG. 14 is a block diagram illustrating a configuration of a video game processing a server 10F (hereinafter, referred to as a "server 10F"), which is an example of the video game processing server 10. In the present embodiment, the server 10F at least includes a registering unit 11, a generating unit 12, a participating unit 13, and a giving unit 17.

The giving unit 17 has a function to give, on the basis of at least an operation by a user for whom an event is generated, a reward to an object that is caused to participate in the event by the participating unit 13 or a user of the object.

Here, the operation by the user means an operational input to a user terminal 20 by the user. The operation by the user is not limited particularly. However, it is preferable that the operation is an operation related to the object caused to participate in the event by the participating unit 13. As an example of the operation by the user, there is a selection operation against the object caused to participate in the event by the participating unit 13.

Further, the content of the reward is not limited particularly. However, it is preferable that the reward is meaningful to a player of a video game. As examples of the reward, there are an in-game element, occurrence of a temporary process in the video game (for example, occurrence of a so-called buff, or occurrence of an effect of an item), equipment, items, in-game currency, an experience point associated with the user or an object, and the like.

Figure 15:
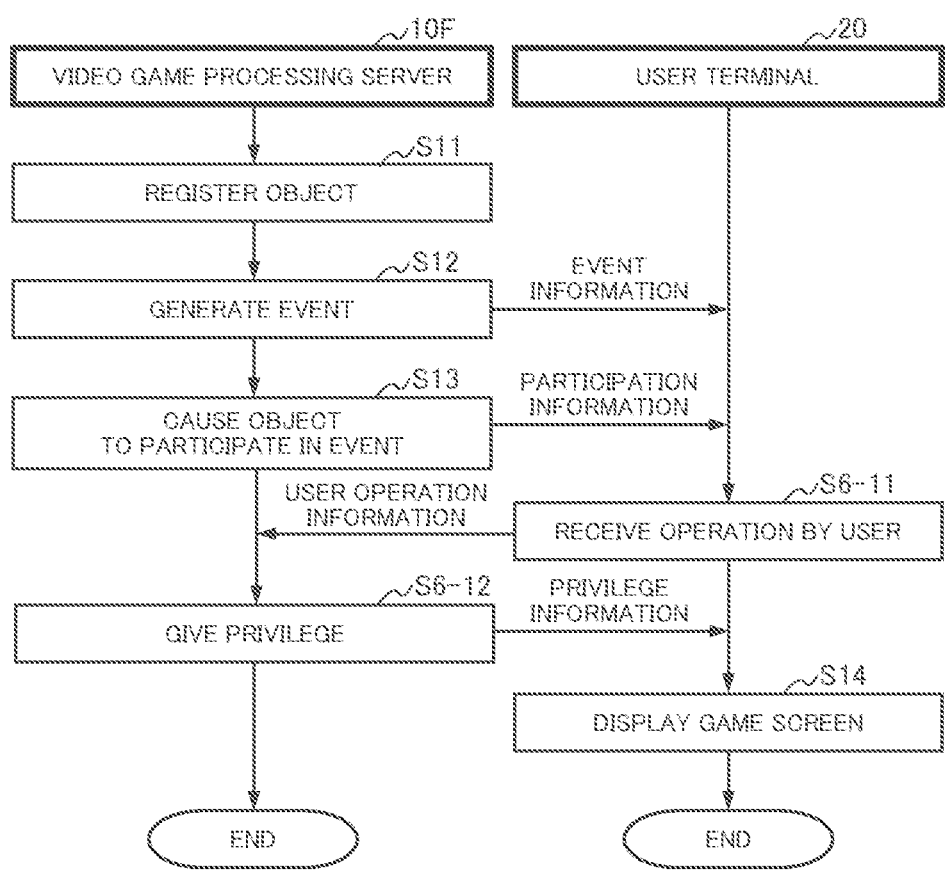
FIG. 15 is a flowchart illustrating an example of game processing corresponding to at least one of the embodiments of the present disclosure.

FIG. 15 is selectable a flowchart illustrating an example of game processing executed by the system 100. Hereinafter, operations of the server 10F and the user terminal 20 (hereinafter, referred to as the "terminal 20") will be described as an example. In this regard, a flowchart illustrating an operation of each of the server 10F and the terminal 20 is omitted from a point of view to avoid repeated explanation.

When participation information is received from the server 10F, the terminal 20 receives an operation by a user (Step S6-11). In the present embodiment, the terminal 20 transmits, to the server 10F, information regarding the operation by the user (user operation information).

When the user operation information is received from the terminal 20, the server 10F gives, on the basis of at least the operation by the user for whom an event is generated, a reward to an object that is caused to participate in the event or the user of the object (Step S6-12). In the present embodiment, the server 10F transmits, to the server 10F, reward information for giving the reward.

As explained above, as one aspect of the sixth embodiment, the server 10F that controls progress of the video game using the virtual space corresponding to the map information of the real space and the positional information of the user terminal 20 is configured so as to include the registering unit 11, the generating unit 12, the participating unit 13, and the giving unit 17. Thus, the giving unit 17 gives the reward to the object that participate in the event or the user of the object on the basis of at least the operation of the user for whom the event is generated. Therefore, it is possible to expect that the user is caused to register the object for the purpose of giving the reward.

Seventh Embodiment

Figure 16:
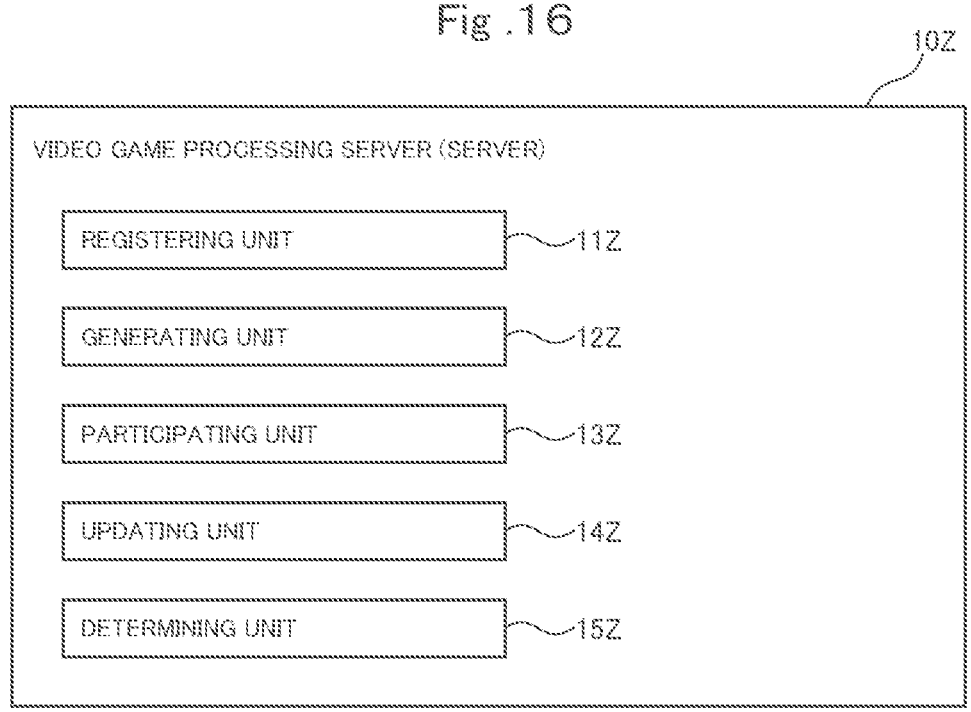
FIG. 16 is a block diagram illustrating a configuration of a server corresponding to at least one of the embodiments of the present disclosure.

FIG. 16 is a block diagram illustrating a configuration of a video game processing server 10Z (hereinafter, referred to as a "server 10Z"), which is an example of the video game processing server 10. In the present embodiment, the server 10Z at least includes a registering unit 11Z, a generating unit 12Z, a participating unit 13Z, an updating unit 14Z, and a determining unit 15Z.

The registering unit 11Z has a function to register objects of users.

Here, each of the objects of the users means an object corresponding to the user. Further, the object means a virtual object that appears in a video game. In this regard, each of the objects of the users may be an object that can carry out any action in the video game. Hereinafter, a case where the object of the user is a character that can be operated by the user will be described as an example.

Further, the phase "register objects" means that information regarding the objects is stored in a predetermined storage unit. Hereinafter, a case where the character of the user can be associated with the other users will be described as an example. In this regard, the registering unit 11Z may be configured so that information on the character registered by the user at the time of registration is maintained until next registration, or may be configured so that the information on the character registered by the user is periodically updated to the latest information. Further, the registering unit 11Z may be configured so that the user is allowed to register a plurality of characters.

The generating unit 12Z has a function to generate a predetermined event on the basis of positional information of a user terminal 20 (hereinafter, referred to as a "terminal 20") of a user.

Here, the positional information of the terminal 20 means information indicating a position of the terminal 20 in a real space. Further, the event means any of various kinds of occurrences that can be generated in the video game. Hereinafter, a configuration in which a battle with an enemy character occurs on the basis of the position of the terminal 20 owned by the user in the real space will be described as an example.

The participating unit 13Z has a function to cause an object of another user different from the user (that is, a second user), for whom the event is generated, among the objects registered by the registering unit 11Z to participate in the event.

Here, a configuration to cause the object of the other user to participate in the event is not limited particularly. However, it is preferable that progress of the event becomes advantageous when the other user participates in the event. Hereinafter, a configuration in which a character associated with the user, for whom the event is generated, among characters registered by the other user before the event is generated, participates in a battle against an enemy character as a helper will be described as an example. In this regard, in a case where a plurality of characters is associated with the user, the participating unit 13Z may be configured so that one character is selected as a helper in accordance with a predetermined priority rule. As an example of such a configuration, there is a configuration in which a character registered by a friend or a character registered by a user having a similar progress (a level or a rank) of the video game is preferentially selected.

The updating unit 14Z has a function to update registration related information so that participation of each of the objects, which have already participated in the event by the participating unit 13Z, in a new event generated after the event is restricted.

Here, the phrase "participation of the object in the event is restrict" means that a permissible range where the object is caused to participate in the event is defined. Hereinafter, a case where a character that participates in a battle event as a helper becomes unable to participate in the battle of the same user for a certain period of time when a predetermined period of time elapses since the character participates in the battle event will be described as an example. In this regard, the server 10Z may be configured so that in a case where a predetermined period of time elapses after participation, another character is automatically set as the helper at random. Further, the server 10Z may also be configured so that in a case where the character is changed into a specific character, the user selects a character caused to participate in the battle event as the helper from a plurality of characters associated with the user himself or herself.

The determining unit 15Z has a function to determine whether an object of another user different from the user for whom the event is generated is caused to participate in the event or not on the basis of information regarding the generated event.

Here, the information regarding the event is not limited particularly. However, it is preferable that the information regarding the event is information regarding a type of the event. Hereinafter, a case where the character selected as the helper participates in a battle event generated by the user with a probability corresponding to the type of the battle event for a predetermined period of time since a time of selection will be described as an example.

In the present embodiment, a "normal battle", a "quest boss battle", and a "strong enemy battle" are included in the event. A battle participation rate as a helper differs depending upon the content called as the helper. The battle participation rate is set to a certain probability in the normal battle; is set to no helper participation in the quest boss battle; and is set to 100% participation in the strong enemy battle.

FIG. 17 is an explanatory drawing for explaining an example of a storage state of information stored in a storage unit (not illustrated in the drawings) included in the server 10Z. As illustrated in FIG. 17, the storage unit stores a user ID, a registered own character name, a selected other character name, and a candidate other character name therein as the registration related information so as to be associated with each other.

Here, the user ID means information for identifying the user.

Further, the registered own character name means a character name of the user identified by the user ID. In the present embodiment, a character of each user himself or herself is registered therein.

Further, the selected other character name means a character name that is selected by the participating unit 13Z as an object caused to participate in the battle event among characters of users different from the user identified by the user ID. In the present embodiment, the selected other character name is a character name of a user who is selected by the user and is different from the user.

Further, the candidate other character name means a character name of a candidate that can be set as an object caused to participate in the battle event by the participating unit 13Z among the characters of the users different from the user identified by the user ID.

Figure 18:
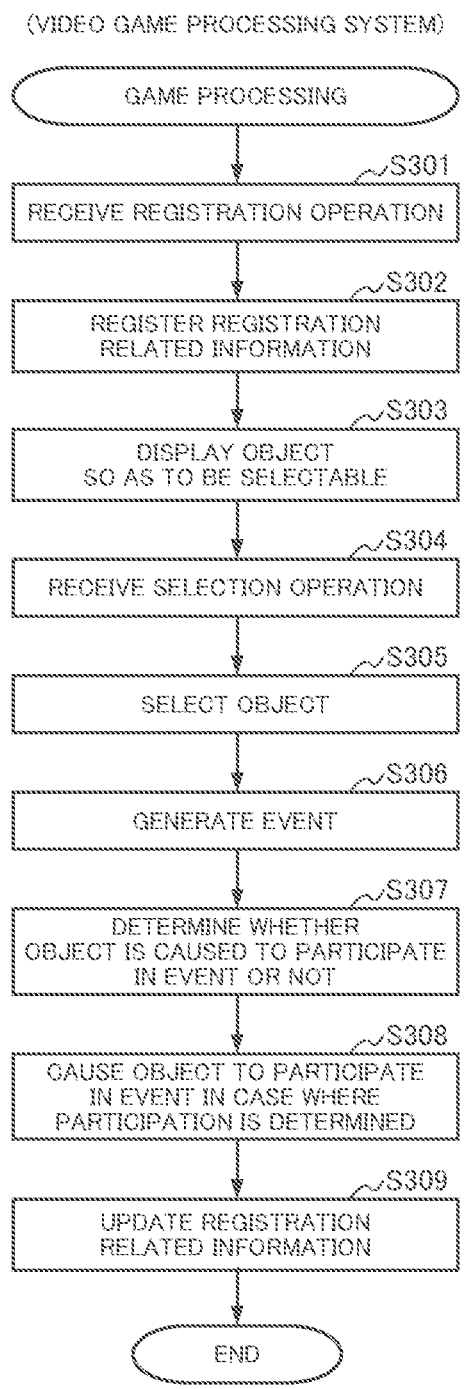
FIG. 18 is a flowchart illustrating an example of game processing corresponding to at least one of the embodiments of the present disclosure.

FIG. 18 is a flowchart illustrating an example of game processing executed by a video game processing system 100Z (hereinafter, referred to as a "system 100Z") provided with the server 10Z. In the game processing according to the present embodiment, processes related to a control of progress of the video game using positional information of the terminal 20 are executed in response to an operation of the user. Hereinafter, each of the processes will be described. In this regard, the order of the processes may be changed without any contradiction or the like of processing content.

The game processing is started as an opportunity that the terminal 20 accessing the server 10Z requests display of a registration screen for an object, for example.

In the game processing, the system 100Z first receives a registration operation for an object from the user (Step S301).

When the registration operation for the object is received from the user, the system 100Z registers registration related information, in which the user is associated with a character of another user different from the user, in a predetermined storage region (Step S302). In the present embodiment, the system 100Z registers the registration related information, in which the user, a character of the user, and the object of another user different from the user are associated with each other, in the predetermined storage region.

When the registration related information is registered, the system 100Z selectably displays, for the user, the object of another user different from the user (Step S303). In the present embodiment, the system 100Z causes the terminal 20 of the user to selectably display information indicating the character of another user different from the user.

When the object is selectably displayed, the system 100Z receives a selection operation for the selectably displayed object from the user (Step S304).

When the selection operation for the object is received from the user, the system 100Z selects the object selected by the user as an object caused to participate in a predetermined event (Step S305). In the present embodiment, the system 100Z selects a character of the other user different from the user, which is caused to participate in a battle event generated for the user, as a helper.

When the object is selected, the system 100Z generates a predetermined event on the basis of positional information of the terminal 20 of the user (Step S306). In the present embodiment, the system 100Z generates a battle event against an enemy character by the character of the user.

When the predetermined event is generated, the system 100Z determines whether the object of the other user different from the user for whom the event is generated is caused to participate in the event or not on the basis of information regarding the generated event (Step S307). In the present embodiment, the system 100Z determines whether the object is caused to participate in the battle event generated for the user or not with a probability corresponding to a type of the battle event.

When it is determined whether the object is caused to participate in the event or not, the system 100Z causes the object selected from registered objects to participate in the event in a case where it is determined that the object is caused to participate in the event (Step S308). In the present embodiment, the system 100Z causes the character selected by the user to participate in the battle event against the enemy character.

When the object is caused to participate in the event, the system 100Z updates the registration related information so that participation of the object, which has already participated in the event, in a new event generated after the event is restricted (Step S309). In the present embodiment, the system 100Z updates the registration related information so that the character cannot participate in a battle event against an enemy character.

In the present embodiment, when the registration related information is updated so that participation in a new event is restricted, the system 100Z terminates the processes herein.

Figure 19:
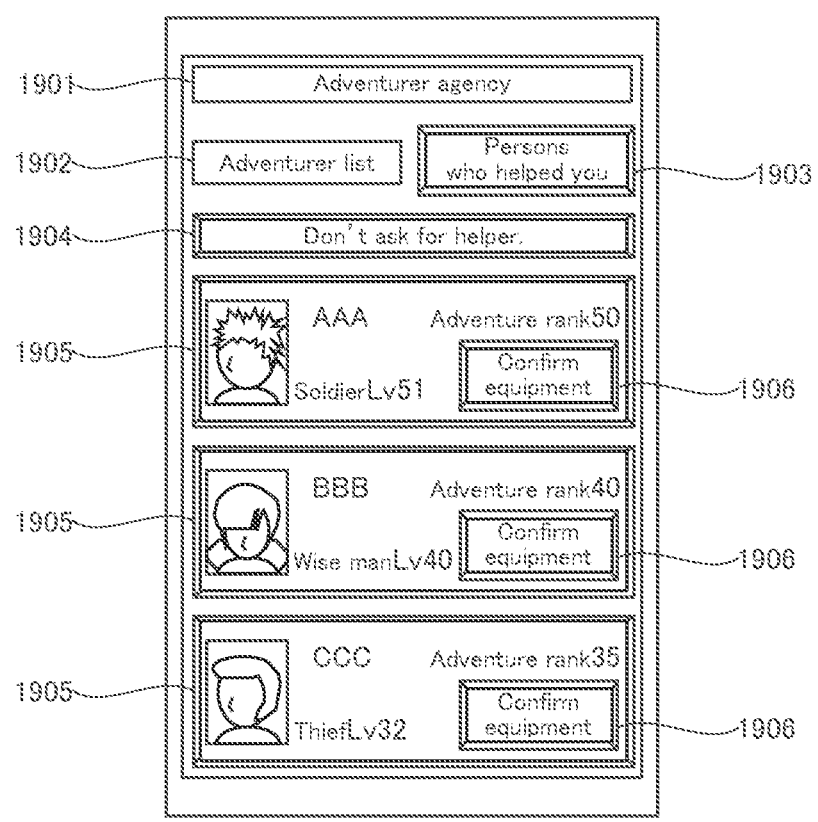
FIG. 19 is an explanatory drawing illustrating an example of a display screen corresponding to at least one of the embodiments of the present disclosure

FIG. 19 is an explanatory drawing for explaining an example of a game screen. As illustrated in FIG. 19, a screen explanation area 1901, a candidate other character display button 1902, a participation history display button 1903, a non-selection button 1904, candidate other character information areas 1905, and detailed information display buttons 1906 are illustrated on the game screen.

The screen explanation area 1901 is an area for indicating a title of a screen displayed currently. In the present embodiment, the screen explanation area 1901 is an area for indicating that the currently displayed screen is a screen for selecting a character that is caused to participate in a battle event as a helper.

The candidate other character display button 1902 is a button for displaying information regarding characters that becomes candidate caused to participate in the battle event. In the present embodiment, the candidate other character display button 1902 is in a state where a selection operation is made. In this regard, a method of selecting the characters that become the candidates is not limited particularly. However, it is preferable that a plurality of characters is selected as candidates on the basis of a relationship with the user. As an example of such a configuration, there is a configuration in which 10 characters registered by friends in the video game are selected every day. In this case, the characters of the friends may be configured so as to be displayed preferentially from the top of 10 frames, and characters of users other than the friends may be configured so as to be displayed below the 10 frames.

The participation history display button 1903 is a button for displaying a participation history in battle events by a character of the other user different from the user. In the present embodiment, when a selection operation is made against the participation history display button 1903, information regarding the characters caused to participate in the battle events as the helpers and the users of the characters is displayed.

The non-selection button 1904 is a button for selecting a situation that the character of the other user different from the user is not caused to participate in the battle event. In the present embodiment, when a selection operation is made against the non-selection button 1904, any helper does not participate in the battle event.

Each of the candidate other character information areas 1905 is an area in which information regarding the character that becomes the candidate caused to participate in the battle event is displayed. In the present embodiment, each of the candidate other character information areas 1905 is an area for displaying an appearance image, a name, a job, a level, and the like of the corresponding character. Here, when a touch operation against the information regarding the character displayed in the candidate other character information area 1905 is made, the character against whose information the touch operation is made is selected as a helper. In this regard, as a method of displaying the information regarding the character, part of the information may be configured so as to be changed or not to be displayed. As an example of such a configuration, there is a configuration in which when a character registered by a user is associated with another user, the character is associated with another user in a state where a name of the character is changed in accordance with a predetermined rule (for example, selected from a plurality of names at random). This makes it possible to strengthen protection of user privacy.

Each of the detailed information display buttons 1906 is a button for displaying detailed information of an object that is a candidate caused to participate in an event. In the present embodiment, when a selection operation is made against the detailed information display button 1906, equipment information of the character is displayed so that information is displayed in the candidate other character information area 1905.

Figure 20:
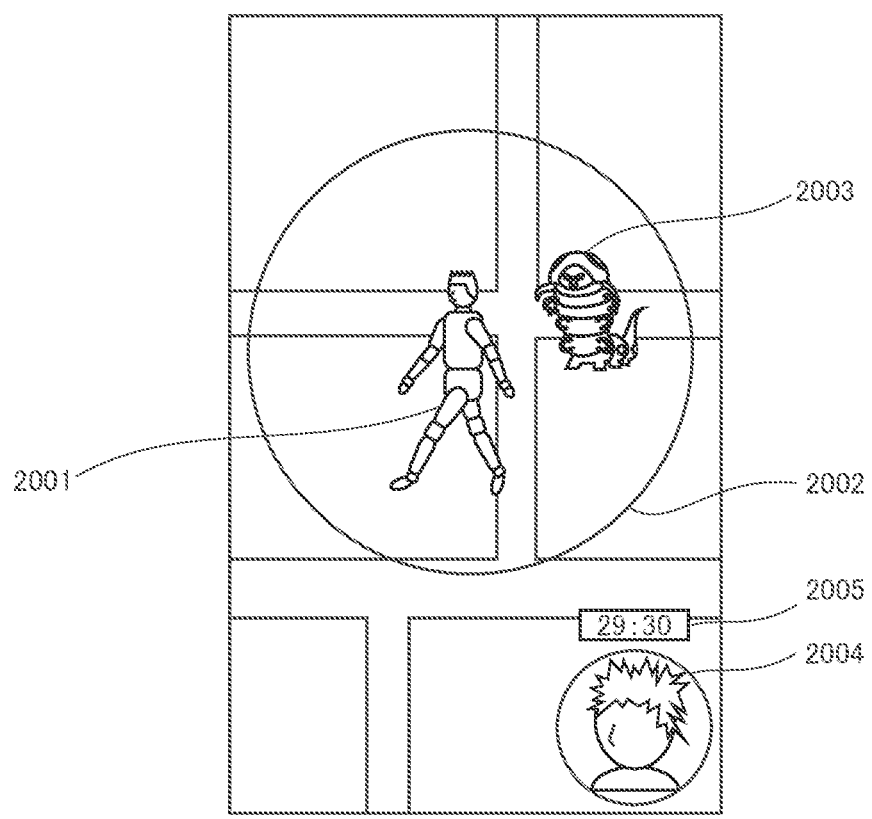
FIG. 20 is an explanatory drawing illustrating another example of the display screen corresponding to at least one of the embodiments of the present disclosure.

FIG. 20 is an explanatory drawing for explaining another example of the game screen. As illustrated in FIG. 20, a character 2001 of the user, an event generable area 2002 based on a position of the character 2001, an enemy character 2003, selected other character information 2004, and participation period information 2005 are illustrated in the game screen.

The character 2001 is an image indicating the character of the user. The character 2001 is illustrated at a position near the center of the display screen, and is displayed at a position in a virtual space corresponding to positional information of the terminal 20. When the position of the terminal 20 changes in a real space, the character 2001 similarly moves in the virtual space. Further, the event generable area 2002 also moves in accordance with the movement of the character 2001.

The event generable area 2002 is an area that satisfies a positional condition included in conditions for generating an event corresponding to an object. The positional condition indicates that a position of the user in the virtual space and a position of the object have a predetermined relationship.

The enemy character 2003 is an image for which a battle event against an enemy character is generated when the user carries out a touch operation against the enemy character 2003 in a state where the enemy character 2003 exists in the event generable area 2002. When the user carries out a selection operation against the enemy character 2003 in the event generable area 2002, a screen for starting a battle against the enemy character 2003 is displayed.

The selected other character information 2004 is information indicating the character selected in the game screen illustrated in FIG. 19 so as to be caused to participate in the event. In the present embodiment, an image of a character "AAA" displayed in the game screen illustrated in FIG. 19 is displayed as the selected other character information 2004.

The participation period information 2005 is information indicating a period of time during which the character selected in the game screen illustrated in FIG. 19 so as to be caused to participate in the event can be caused to participate in the event. In the present embodiment, a period of time during which the character "AAA" can be caused to participate in the battle event is displayed as the participation period information 2005 in the form of the remaining time.

Figure 21:
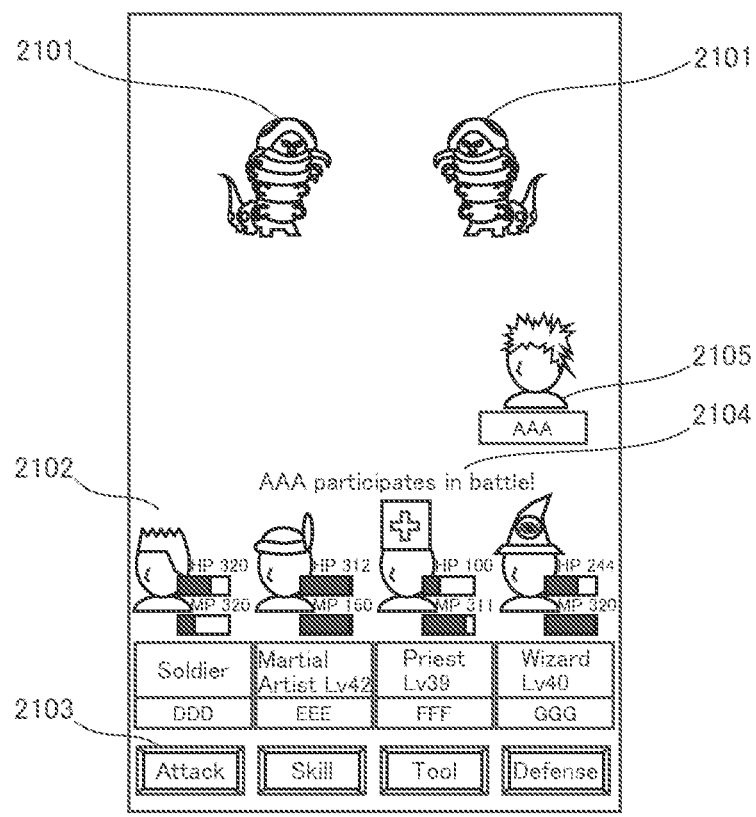
FIG. 21 is an explanatory drawing illustrating still another example of the display screen corresponding to at least one of the embodiments of the present disclosure.

FIG. 21 is an explanatory drawing for explaining still another example of the game screen. As illustrated in FIG. 21, enemy characters 2101, own character information 2102, a command selecting area 2103, participation notification information 2104, and other character participation information 2105 are illustrated in the game screen.

Each of the enemy characters 2101 is an image of an enemy character (for example, a monster) that becomes a defeat target in a generated battle event. In the present embodiment, each of the enemy characters 2101 is the same as the enemy character 2003 illustrated in FIG. 20.

The own character information 2102 is information regarding a user character of a user himself or herself for whom the battle event is generated. In the present embodiment, the own character information 2102 contains an appearance image, a name, a job, a parameter, and the like of the character of the user for whom the battle event is generated.

The command selecting area 2103 is an area for inputting an operation for causing the character to act in the battle event.

The participation notification information 2104 is information for notifying the user that a character of another user different from the user for whom the battle event is generated participates in the battle event. In the present embodiment, the user is notified by text that the character "AAA" participates in the battle event.

The other character participation information 2105 is information regarding the character that is selected in the game screen illustrated in FIG. 19 and further participated in the battle event. In the present embodiment, the appearance image and the name of the character "AAA" are displayed. In this regard, in a case where the character "AAA" acts in the battle event, the whole appearance of the character "AAA" is displayed on the screen.

In this regard, the server 10Z may be configured so that a reward is given to the character that carries out a battle as a helper for the user of the character on the basis of an operation of the user during the battle event illustrated in FIG. 21 or after the battle event. Here, the content of the reward is not limited particularly. However, it is preferable that the user who receives the reward can recognize that by registering the character, gratitude or favor is indicated from the other user. As an example of such a configuration, there is an increase of a point that each user can possess or a parameter indicating a degree of intimacy between two users. Further, the server 10Z may be configured so that the reward is given to the character or the user of the character in accordance with participation of the character in the battle event (regardless of the operation of the user).

As explained above, as one aspect of the seventh embodiment, the server 10Z that controls progress of video game using the virtual space corresponding to the map information of the real space and the positional information of the user terminal 20 is configured so as to include the registering unit 11Z, the generating unit 12Z, the participating unit 13Z, the updating unit 14Z, and the determining unit 15Z. Thus, the registering unit 11Z registers the objects of the users; the generating unit 12Z generates the predetermined event on the basis of the positional information of the terminal 20 of the user; the participating unit 13Z causes the object of another user different from the user, for whom the event is generated, among the registered objects to participate in the event. Therefore, it becomes possible to maintain interest of the user in the video game.

Further, in the example of the seventh embodiment described above, the server 10Z is configured so that: the registering unit 11Z registers the registration related information in the predetermined storage region, the user being associated with the objects of the users different from the user in the registration related information; the participating unit 13Z causes at least the part of the objects associated with the user to participate in the event; and the updating unit 14Z updates the registration related information so that participation of each of the objects, which have already participated in the event by the participating function, in the new event generated after the event is restricted. Therefore, it is possible to interact with more users through the object compared with a case where participation of an object in an event is not restricted, and this makes it possible to further maintain interest of the user in the video game.

Further, in the example of the seventh embodiment described above, the server 10Z is configured so that: the determining unit 15Z determines whether the object of the user different from the user, for whom the event is generated, is caused to participate in the event or not on the basis of information regarding the generated event; and the participating unit 13Z causes the object to participate in the event in a case where the determining unit 15Z determines that the object is caused to participate in the event. Therefore, it becomes possible to provide an opportunity for interaction among users through an object, and to set an appropriate game balance at the same time.

Further, in the example of the seventh embodiment described above, the server 10Z may be configured so that: a displaying unit selectably displays, for the user, the object of another user different from the user; and the participating unit 13E causes the object selected by the user to participate in the generated event. Therefore, it becomes possible to interact with more other users desired by the user through the object, and this makes it possible to further maintain interest of the user in the video game.

Further, it has not been mentioned particularly in the example of the seventh embodiment described above. However, the server 10Z as the updating unit 14Z may be configured so as to update the registration related information so that participation of an object in the new event generated after the event is restricted on the basis of a relationship between the user of the object that has participated in the event by the participating unit 13Z and the user for whom the event is generated. Here, the relationship with the user means a type of connection to the user. The relationship with the user is not limited particularly. However, it is preferable that the relationship with the user is one related to progress of the video game. As examples of the relationship with the user, there are a relationship that a user is a friend with the user, and a relationship that a parameter (or a rank) indicating progress of the video game is within the predetermined same range as that of the user. In the example described above, the server 10Z may be configured so that in a case where the user of the character is a friend, a period of time during which participation in a battle event is permitted is longer compared with a case where the user is not a friend. By configuring the server 10Z in this manner, it becomes possible to encourage interaction through the objects with users who are more likely to heighten the sense of unity compared with the other users.

Further, it has not been mentioned particularly in the example of the seventh embodiment described above. However, the server 10Z may be configured so as to: update the registration related information so that each of the objects that have already participated in the event by the participating unit 13Z becomes a participation impossible state where the corresponding object cannot participate in the new event generated after the event; and cause, in a case where the plurality of objects other than the objects that become the participation impossible state is associated with still another user, for whom an event is newly generated, an object of a user who satisfies a specific condition for the third user of the plurality of objects to participate in the event in a preferential manner. Here, the content of the specific condition is not limited particularly. However, it is preferable that the specific condition is an object of a user who has a predetermined relationship with the user for whom the event is generated. As an example of the specific condition, there is a condition that the object is an object of a user who is a friend with the user for whom the event is generated. Further, the phrase "cause an object to participate in the event in a preferential manner" means that the object is cause to participate in more events compared with the other objects. In the example described above, the server 10Z may be configured so that after a predetermined time elapses since the user selects one character as a helper, a character of a user who has a friend relationship with the user is newly causes to participate in a battle event as a helper. By configuring the server 10Z in this manner, it becomes possible to increase an opportunity for interaction with a predetermined user through an object.

Further, it has not been mentioned particularly in the example of the seventh embodiment described above. However, the server 10Z may be configured so as to cause an object of a user, who satisfies a predetermined condition regarding a position of the user for whom the event is generated or a position designated by the user, to participate in the event. Namely, the server 10Z may be configured so that an object of a user who plays the video game in the vicinity of a current location of the user (for example, a user who uses the same spot or destination used most recently without leaving the current location on the server) is caused to participate in the generated event. Here, the position of the user means a position of the user in the real space or the virtual space. The position of the user is not limited particularly. However, it is preferable that the position of the user is a position in the virtual space corresponding to the positional information of the terminal 20 of the user. As an example of the position of the user, there is a position in the virtual space corresponding to a predetermined point (or a spot) in the real space. Further, the position designated by the user means a position in the real space or the virtual space that is specified by the user. A configuration to specify the position designated by the user is not limited particularly. However, it is preferable that the position in the virtual space is specified on the basis of an operation received from the user. As examples of such a configuration, there are a position of a base (home) set in the virtual space by the user, and any position in a predetermined area in which a position of the base is included. By configuring the server 10Z in this manner, it becomes possible to further enhance the sense of unity among the users that the video game is progressing in the same virtual space.

Further, it has not been mentioned particularly in the example of the seventh embodiment described above. However, the server 10Z may be configured so as to control the object that is caused to participate in the event by the participating unit 13Z without depending upon an operation of the user for whom the event is generated. Here, the operation of the user means an operation from the user against the object caused to participate in the event by the participating unit 13Z or an operation from the user against the event. Further, the phrase "control the object without depending upon an operation of the user" means that the object is controlled without the operation of the user as a condition. In the example described above, the server 10Z may be configured so that the character that participates in the battle event by the participating unit 13Z automatically fights against an enemy character. By configuring the server 10Z in this manner, it becomes possible to provide an opportunity for interaction with the other user more flexibly without the need to adjust the time among users. In this regard, the object that is caused to participate in the event by the participating unit 13Z may be controlled by an operation of the user.

Further, it has not been mentioned particularly in the example of the seventh embodiment described above. However, the server 10Z may be configured so as to restrict, in the generated event, an effect generated by the object that is caused to participate in the event. Here, the phrase "restrict an effect generated by the object" means that a permissible range is provided for a degree of influence of the object on the event in which the object participates. In the example described above, the server 10Z may be configured so that the character that participate in the battle event by the participating unit 13Z does not fight against the enemy character after a predetermined turn or a predetermined time elapses. By configuring the server 10Z in this manner, it becomes possible to maintain a game balance even in a case where an object of a user whose progress of the video game is different from that of the user participates in the event generated for the user.

As explained above, one shortage or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, and 201 to 20n and the server 10 executes the various kinds of processing described above in accordance with various kinds of control programs (for example, a video game processing program) stored in the storage device with which the corresponding terminal or server is provided.

Further, the configuration of the system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20, and 201 to 20*n* (for example, the user terminal 20) executes a part or all of the processes that have been explained as the processes executed by the server 10. Further, the system 100 may be configured so that a part or all of the storage unit included in the server 10 is included in any of the plurality of user terminals 20, and 201 to 20*n*. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

Appendix

The explanation of the embodiments described above has been described so that the following embodiments can be at least performed by a person having a normal skill in the art to which the present disclosure belongs.

(1)

A non-transitory computer-readable medium including a video game processing program for causing a server to perform functions to control progress of a video game using a virtual space corresponding to map information of a real space and positional information of a user terminal of a user, the functions comprising:

a registering function configured to register objects of a plurality of users;

a generating function configured to generate a predetermined event on a basis of positional information of a user terminal of a first user; and a participating function configured to cause an object of a second user different from the first user, for whom the event is generated, among the objects registered by the registering function to participate in the event.

(2)

The non-transitory computer-readable medium according to (1), wherein the registering function includes a function configured to register registration related information in a predetermined storage region, the first user being associated with the objects of the users different from the first user in the registration related information, wherein the participating function includes a function configured to cause at least a part of the objects associated with the first user to participate in the event, and wherein the functions further include an updating function configured to update the registration related information so that participation of each of the objects, which have already participated in the event by the participating function, in a new event generated after the event is restricted.

(2-1)

The non-transitory computer-readable medium according to (2), wherein the updating function includes a function configured to update the registration related information so that participation of an object in the new event generated after the event is restricted on a basis of a relationship between a user of the object that has participated in the event by the participating function and the first user for whom the event is generated.

(2-2)

The non-transitory computer-readable medium according to (2) or (2-1), wherein the updating function includes a function configured to update the registration related information so that each of the objects that have already participated in the event by the participating function becomes a participation impossible state where the corresponding object cannot participate in the new event generated after the event, and wherein the participating function includes a function configured to cause, in a case where the plurality of objects other than the objects that become the participation impossible state is associated with the first user for whom an event is newly generated, an object of a user who satisfies a specific condition for the third user of the plurality of objects to participate in the event in a preferential manner.

(3)

The non-transitory computer-readable medium according to (1) or (2), wherein the participating function includes a function configured to cause an object, which is registered by the registering function and satisfies a predetermined condition in accordance with progress of the video game by the first user, to participate in the event generated for the first user.

(4)

The non-transitory computer-readable medium according to any one of (1) to (3), the functions further comprising:

a determining function configured to determine whether the object of the second user different from the first user, for whom the event is generated, is caused to participate in the event or not on a basis of information regarding the generated event, wherein the participating function includes a function configured to cause the object to participate in the event in a case where the determining function determines that the object is caused to participate in the event.

(5)

The non-transitory computer-readable medium according to any one of (1) to (4), the functions further comprising:

a displaying function configured to selectably display the objects of the users different from the first user to the first user, and wherein the participating function includes a function configured to cause an object selected by the first user to participate in the generated event.

(6)

The non-transitory computer-readable medium according to any one of (1) to (5), the functions further comprising:

a giving function configured to give, on a basis of at least an operation by the first user for whom the event is generated, a reward to the object that is caused to participate in the event by the participating function or the user of the object.

(7)

The non-transitory computer-readable medium according to any one of (1) to (6),
wherein the participating function includes a function configured to cause an object of a user, who satisfies a predetermined condition regarding a position of the first user for whom the event is generated or a position designated by the first user, to participate in the event.

(8)

The non-transitory computer-readable medium according to any one of (1) to (7), the functions further comprising:
a controlling function configured to control the object that is caused to participate in the event by the participating function without depending upon an operation of the first user for whom the event is generated.

(9)

The non-transitory computer-readable medium according to any one of (1) to (8),
wherein the participating function includes a function configured to restrict, in the generated event, an effect generated by the object that is caused to participate in the event.

(10)

A non-transitory computer-readable medium including a video game processing program for causing a user terminal to perform at least one function of the functions that the video game processing program described in any one of (1) to (9) causes the server to perform, the user terminal being capable of communicating with the server.

(11)

A video game processing system for controlling progress of a video game using a virtual space corresponding to map information of a real space and positional information of a user terminal of a user, the video game processing system comprising a communication network, a server, and the user terminal, the video game processing system further comprising:
a registerer configured to register objects of a plurality of users;
a generator configured to generate a predetermined event on a basis of positional information of a user terminal of a first user; and
a participator configured to cause an object of a second user different from the first user, for whom the event is generated, among the objects registered by the registerer to participate in the event.

(12)

The video game processing system according to (11),
wherein the server includes the registerer, the generator, and the participator, and
wherein the user terminal includes an output controller configured to output a game screen to a display screen of a display device, the game screen indicating a state of the predetermined object.

(13)

A non-transitory computer-readable medium including a video game processing program for causing a user terminal to perform functions to control progress of a video game using a virtual space corresponding to map information of a real space and positional information of the user terminal of a user, the functions comprising:
a registering function configured to register objects of a plurality of users;
a generating function configured to generate a predetermined event on a basis of positional information of a user terminal of a first user, and
a participating function configured to cause an object of a second user different from the first user, for whom the event is generated, among the objects registered by the registering function to participate in the event.

(14)

A video game processing method of controlling progress of a video game using a virtual space corresponding to map information of a real space and positional information of a user terminal of a user, the video game processing method comprising:
a registering process configured to register objects of a plurality of users;
a generating process configured to generate a predetermined event on a basis of positional information of a user terminal of a first user; and
a participating process configured to cause an object of a second user different from the first user, for whom the event is generated, among the objects registered in the registering process to participate in the event.

(15)

A video game processing method of controlling progress of a video game by a video game processing system using a virtual space corresponding to map information of a real space and positional information of a user terminal of a user, the video game processing system comprising a communication network, a server, and the user terminal, the video game processing method comprising:
a registering process configured to register objects of a plurality of users;
a generating process configured to generate a predetermined event on a basis of positional information of a user terminal of a first user; and
a participating process configured to cause an object of a second user different from the first user, for whom the event is generated, among the objects registered in the registering process to participate in the event.

INDUSTRIAL APPLICABILITY

According to one of the embodiments of the present disclosure, it is useful to allow interest of a user in a video game to be maintained.

What is claimed is:

1. A non-transitory computer-readable medium storing a video game processing program for causing a computer of a server to perform functions to control progress of a video game, the functions comprising:
using a virtual space corresponding to map information of a real space;
registering a plurality of objects of a plurality of users;
generating a predetermined first event on a basis of positional information of a first user terminal of a first user of the plurality of users; and
causing an object of a second user of the plurality of users among the plurality of objects to participate in the first event, wherein the second user is different from the first user,
wherein the functions further comprise:
registering registration related information in a predetermined storage region, wherein the first user is associated with one or more objects of one or more users different from the first user in the registration related information;
causing at least one of the one or more objects associated with the first user to participate in the first event; and updating the registration related information to restrict the at least one of the one or more objects from participating in a second event generated after the first event, wherein the functions further comprise:

updating the registration related information to change each object of the objects that have already been caused to participate in the first event into a participation impossible state where the each object is restricted from participating in the second event; and causing an object of a user, who satisfies a specific condition related to a third user of the plurality of objects, to participate in a third event newly generated for the third user with a priority, when the plurality of objects other than the objects in the participation impossible state are associated with the third user.

2. The non-transitory computer-readable medium according to claim 1, the functions further comprising:

updating the registration related information to restrict an object from participating in the second event on a basis of a relationship between the first user and a user of the object caused to participate in the first event.

3. The non-transitory computer-readable medium according to claim 1, the functions further comprising:

causing an object among the plurality of registered objects that satisfies a predetermined condition in accordance with progress of the video game by the first user to participate in the first event.

4. The non-transitory computer-readable medium according to claim 1, the functions further comprising:

determining whether the object of the second user is to be caused to participate in the first event on a basis of information regarding the generated first event; and causing the object of the second user to participate in the first event when the object of the second user is determined to be caused to participate in the first event.

5. The non-transitory computer-readable medium according to claim 1, the functions further comprising:

selectably displaying the objects of the plurality of users different from the first user to the first user; and causing an object selected by the first user to participate in the generated first event.

6. The non-transitory computer-readable medium according to claim 1, the functions further comprising:

giving, a reward to the object that is caused to participate in the first event or the user of the object on a basis of at least an operation by the first user.

7. The non-transitory computer-readable medium according to claim 1, the functions further comprising:

causing an object of a user to participate in the first event, when the user satisfies a predetermined condition regarding either a position of the first user or a position designated by the first user.

8. The non-transitory computer-readable medium according to claim 1, the functions further comprising:

controlling the object that is caused to participate in the first event without depending upon an operation of the first user.

9. The non-transitory computer-readable medium according to claim 1, the functions further comprising:

restricting an effect in the first event generated by the object that is caused to participate in the first event.

10. A video game processing system comprising:
a communication network;
a user terminal; and
a server configured to control progress of a video game using a virtual space corresponding to map information of a real space and positional information of the user terminal, wherein the system is configured to:

register a plurality of objects of a plurality of users;

generate a predetermined first event on a basis of positional information of a user terminal of a first user of the plurality of users; and cause an object of a second user of the plurality of users among the plurality of registered objects to participate in the first event, wherein the second user is different from the first user, wherein the system is further configured to:

register registration related information in a predetermined storage region, wherein the first user is associated with one or more objects of one or more users different from the first user in the registration related information;

cause at least one of the one or more objects associated with the first user to participate in the first event; and update the registration related information to restrict the at least one of the one or more objects from participating in a second event generated after the first event, wherein the system is further configured to:

update the registration related information to change each object of the objects that have already been caused to participate in the first event into a participation impossible state where the each object is restricted from participating in the second event; and cause an object of a user, who satisfies a specific condition related to a third user of the plurality of objects, to participate in a third event newly generated for the third user with a priority, when the plurality of objects other than the objects in the participation impossible state are associated with the third user.

11. A non-transitory computer-readable medium including a video game processing program for causing a computer of a user terminal to perform functions to control progress of a video game, the functions comprising:

using a virtual space corresponding to map information of a real space and positional information of the user terminal of a user;

registering a plurality of objects of a plurality of users;

generating a predetermined first event on a basis of positional information of a user terminal of a first user of the plurality of users; and causing an object of a second user of the plurality of users among the plurality of objects registered to participate in the first event, wherein the second user is different from the first user, wherein the functions further comprise:

registering registration related information in a predetermined storage region, wherein the first user is associated with one or more objects of one or more users different from the first user in the registration related information;

causing at least one of the one or more objects associated with the first user to participate in the first event; and updating the registration related information to restrict the at least one of the one or more objects from participating in a second event generated after the first event, wherein the functions further comprise:
  updating the registration related information to change each object of the objects that have already been caused to participate in the first event into a participation impossible state where the each object is restricted from participating in the second event; and
causing an object of a user, who satisfies a specific condition related to a third user of the plurality of objects, to participate in a third event newly generated for the third user with a priority, when the plurality of objects other than the objects in the participation impossible state are associated with the third user.

\* \* \* \* \*